US010435145B1

(12) United States Patent
Finnell

(10) Patent No.: US 10,435,145 B1
(45) Date of Patent: Oct. 8, 2019

(54) VEHICLE WITH TENSION WING ASSEMBLY

(71) Applicant: Alfred Finnell, Lake Worth, FL (US)

(72) Inventor: Alfred Finnell, Lake Worth, FL (US)

( * ) Notice: Subject to any disclaimer, the term of this patent is extended or adjusted under 35 U.S.C. 154(b) by 235 days.

(21) Appl. No.: 15/469,542

(22) Filed: Mar. 26, 2017

Related U.S. Application Data

(63) Continuation-in-part of application No. 14/204,931, filed on Mar. 11, 2014, which is a continuation-in-part of application No. 12/828,857, filed on Jun. 29, 2010, now Pat. No. 8,668,455, which is a continuation-in-part of application No. 12/496,769, filed on Jul. 2, 2009, now Pat. No. 7,775,760.

(51) Int. Cl.
*B64C 27/473* (2006.01)
*B64C 11/00* (2006.01)
*B64C 27/467* (2006.01)
*B64C 27/08* (2006.01)

(52) U.S. Cl.
CPC .......... *B64C 27/473* (2013.01); *B64C 11/001* (2013.01); *B64C 27/08* (2013.01); *B64C 27/467* (2013.01)

(58) Field of Classification Search
CPC .............. B64C 27/08; B64C 2201/108; B64C 2201/024; B64C 27/467; B64C 27/473; B64C 11/001; B64C 27/20; B64C 29/0033; B64C 29/0025
See application file for complete search history.

(56) References Cited

U.S. PATENT DOCUMENTS

| 155,472 | A | | 9/1874 | Smythe | |
|---|---|---|---|---|---|
| 178,507 | A | | 6/1876 | Burrows | |
| 243,169 | A | * | 6/1881 | Sprague | F04D 29/382 416/132 R |
| 835,667 | A | | 11/1906 | Donnelly | |
| 1,461,048 | A | * | 7/1923 | Roman | F03D 7/0224 416/51 |
| 3,902,072 | A | | 8/1975 | Quinn | |
| 3,930,625 | A | * | 1/1976 | Krivka | B64C 27/08 244/17.21 |
| 3,942,839 | A | * | 3/1976 | Chalk | B60B 1/0207 301/73 |
| 3,974,395 | A | | 8/1976 | Bright | |

(Continued)

*Primary Examiner* — Assres H Woldemaryam
(74) *Attorney, Agent, or Firm* — Allen D Hertz, P.A.; Allen D. Hertz

(57) ABSTRACT

A tension lifting wing wheel assembly includes a peripheral rim located concentrically with a hub supported by a plurality of spokes, each spoke extending therebetween. A series of wings, each wing having an aerodynamically lifting shape extending between a leading edge and a trailing edge. Each wing of the series of wings is assembled to the tension wheel assembly by coupling an area of the wing proximate the leading edge to a leading edge spoke and an area of the wing proximate the trailing edge to a trailing edge spoke. The wings are arranged having a gap provided between the wing trailing edge of each forward located wing and the wing leading edge of each trailing located wing. The tension lifting wing wheel assembly can be employed as a propulsion and/or lifting device integrated into a vehicle, such as an airplane, a helicopter, a tandem rotor helicopter, etc.

22 Claims, 28 Drawing Sheets

(56) References Cited

U.S. PATENT DOCUMENTS

| | | | | |
|---|---|---|---|---|
| 4,087,927 | A | 5/1978 | Basmajian | |
| 4,116,360 | A | 9/1978 | McKernan et al. | |
| 4,116,361 | A | 9/1978 | Stargell | |
| 4,122,971 | A | 10/1978 | Potts | |
| 4,146,264 | A | 3/1979 | Korzeniewski | |
| 4,172,532 | A | 10/1979 | Palsson | |
| 4,182,460 | A | 1/1980 | Holk | |
| 4,256,972 | A | 3/1981 | Wyatt | |
| 4,262,815 | A | 4/1981 | Klein | |
| 4,280,061 | A | 7/1981 | Lawson-Tancred | |
| 4,286,728 | A | 9/1981 | Fraze et al. | |
| 4,289,970 | A | 9/1981 | Deibert | |
| 4,330,714 | A | 5/1982 | Smith | |
| 4,331,881 | A | 5/1982 | Soderholm | |
| 4,340,822 | A | 7/1982 | Gregg | |
| 4,386,713 | A | 6/1983 | Baumeyer | |
| 4,399,925 | A | 8/1983 | Fundom | |
| 4,410,806 | A | 10/1983 | Brulle | |
| 4,426,192 | A | 1/1984 | Chertok | |
| 4,427,897 | A | 1/1984 | Migliori | |
| 4,461,957 | A | 7/1984 | Jallen | |
| 4,476,987 | A | 10/1984 | Nolan | |
| 4,490,093 | A | 12/1984 | Chertok | |
| 4,491,739 | A | 1/1985 | Watson | |
| 4,503,673 | A | 3/1985 | Schachle | |
| 4,567,746 | A | 2/1986 | Fraze et al. | |
| 4,574,975 | A | 3/1986 | Cudzik et al. | |
| 4,656,413 | A | 4/1987 | Bourbeau | |
| 4,685,849 | A | 8/1987 | LaBarge et al. | |
| 4,705,186 | A | 11/1987 | Barrash | |
| 4,711,611 | A | 12/1987 | Fraze | |
| 4,723,687 | A | 2/1988 | Kutterer | |
| 4,793,510 | A | 12/1988 | Arfert et al. | |
| 4,821,912 | A | 4/1989 | Wells | |
| 4,865,215 | A | 9/1989 | Wells | |
| 5,798,632 | A | 8/1998 | Muljadi | |
| 5,823,749 | A | 10/1998 | Green | |
| 5,982,116 | A | 11/1999 | Yang | |
| 6,064,123 | A | 5/2000 | Gislason | |
| 6,155,785 | A * | 12/2000 | Rechnagel | F03D 1/0608 416/196 A |
| 6,320,273 | B1 | 11/2001 | Nemec | |
| 6,726,439 | B2 | 4/2004 | Mikhail et al. | |
| 6,853,096 | B1 | 2/2005 | Yu et al. | |
| 6,864,597 | B1 | 3/2005 | Ricker | |
| 6,957,946 | B1 * | 10/2005 | Vander Kley | F03D 9/00 415/4.2 |
| 7,183,664 | B2 | 2/2007 | McClintic | |
| 7,268,443 | B2 | 9/2007 | Kikuchi | |
| 7,399,162 | B2 * | 7/2008 | Williams | F03D 1/0675 416/189 |
| 7,425,774 | B2 * | 9/2008 | Shibata | F03D 7/0236 290/44 |
| 7,436,086 | B2 | 10/2008 | McClintic | |
| 7,615,880 | B2 | 11/2009 | Kikuchi | |
| 7,775,760 | B1 | 8/2010 | Finnell | |
| 7,863,767 | B2 | 1/2011 | Chapple | |
| 7,952,216 | B2 | 5/2011 | Kikuchi | |
| 8,011,614 | B2 * | 9/2011 | Bird | B64C 27/18 244/12.2 |
| 8,174,142 | B2 | 5/2012 | Barber | |
| 8,178,987 | B2 | 5/2012 | Mahawili | |
| 8,242,620 | B2 | 8/2012 | Kikuchi | |
| 8,258,645 | B2 * | 9/2012 | Barber | F03D 1/0608 290/55 |
| 8,278,773 | B2 | 10/2012 | Murata | |
| 8,362,633 | B2 | 1/2013 | Tsutsumi | |
| 8,368,236 | B2 | 2/2013 | Ben-David | |
| 8,436,485 | B1 | 5/2013 | Smith | |
| 8,464,990 | B2 | 6/2013 | Flores | |
| 8,466,573 | B2 | 6/2013 | Kikuchi | |
| 8,502,402 | B2 | 8/2013 | Hamano | |
| 8,598,731 | B2 * | 12/2013 | Pitre | F03D 3/061 290/55 |
| 8,736,093 | B2 | 5/2014 | Kii | |
| 8,870,553 | B2 | 10/2014 | Lavender | |
| 9,004,864 | B2 | 4/2015 | Stimm | |
| 9,103,438 | B2 | 8/2015 | Caldwell | |
| 9,194,371 | B2 | 11/2015 | Stimm | |
| 9,328,720 | B2 | 5/2016 | Caldwell | |
| 9,331,534 | B2 | 5/2016 | Yost | |
| 9,631,503 | B2 | 4/2017 | Ehrnberg | |
| 9,797,373 | B2 | 10/2017 | Aihara | |
| 2007/0024058 | A1 | 2/2007 | McClintic | |
| 2007/0138798 | A1 | 6/2007 | McClintic | |
| 2007/0221779 | A1 * | 9/2007 | Ikeda | B64C 11/001 244/7 A |
| 2008/0069696 | A1 | 3/2008 | Ball | |
| 2008/0253892 | A1 | 10/2008 | Dehlsen | |
| 2009/0058095 | A1 | 3/2009 | McClintic | |
| 2009/0140522 | A1 | 6/2009 | Chapple | |
| 2009/0230235 | A1 * | 9/2009 | McNulty | B64C 1/00 244/17.23 |
| 2010/0109324 | A1 | 5/2010 | Ben-David | |
| 2010/0140951 | A1 * | 6/2010 | Pitre | F03D 3/061 290/55 |
| 2010/0295317 | A1 | 11/2010 | Mahawili | |
| 2010/0303623 | A1 | 12/2010 | Dawoud | |
| 2011/0107684 | A1 | 5/2011 | Flores | |
| 2012/0045327 | A1 | 2/2012 | Caldwell | |
| 2012/0060684 | A1 | 3/2012 | Lavender | |
| 2012/0061958 | A1 | 3/2012 | Tsutsumi | |
| 2012/0076652 | A1 | 3/2012 | Ventzke | |
| 2012/0096844 | A1 | 4/2012 | Caldwell | |
| 2012/0117958 | A1 | 5/2012 | Caldwell | |
| 2012/0133342 | A1 | 5/2012 | Murata | |
| 2012/0280503 | A1 | 11/2012 | Mahawili | |
| 2013/0009612 | A1 | 1/2013 | Caldwell | |
| 2013/0134708 | A1 | 5/2013 | Hamano | |
| 2013/0149171 | A1 | 6/2013 | Caldwell | |
| 2013/0214537 | A1 | 8/2013 | Hashimoto | |
| 2013/0221676 | A1 | 8/2013 | Caldwell | |
| 2013/0226458 | A1 | 8/2013 | Nakamura | |
| 2013/0234436 | A1 | 9/2013 | Kii | |
| 2013/0287572 | A1 | 10/2013 | Ehrnberg | |
| 2014/0054893 | A1 | 2/2014 | Lindholdt | |
| 2014/0070534 | A1 | 3/2014 | Hamano | |
| 2014/0234120 | A1 | 8/2014 | Aihara | |
| 2015/0240783 | A1 | 8/2015 | Kii | |
| 2015/0244220 | A1 | 8/2015 | Yost | |
| 2016/0208898 | A1 | 7/2016 | Caldwell | |

* cited by examiner

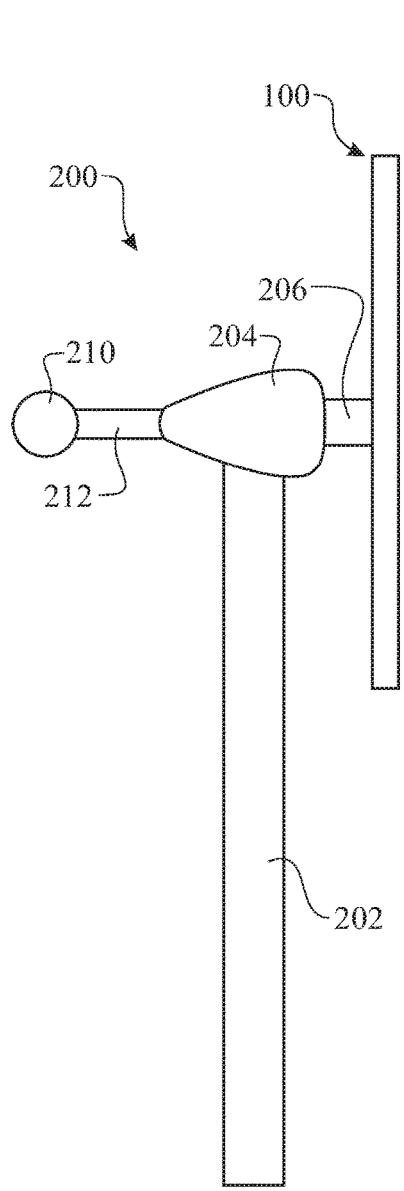 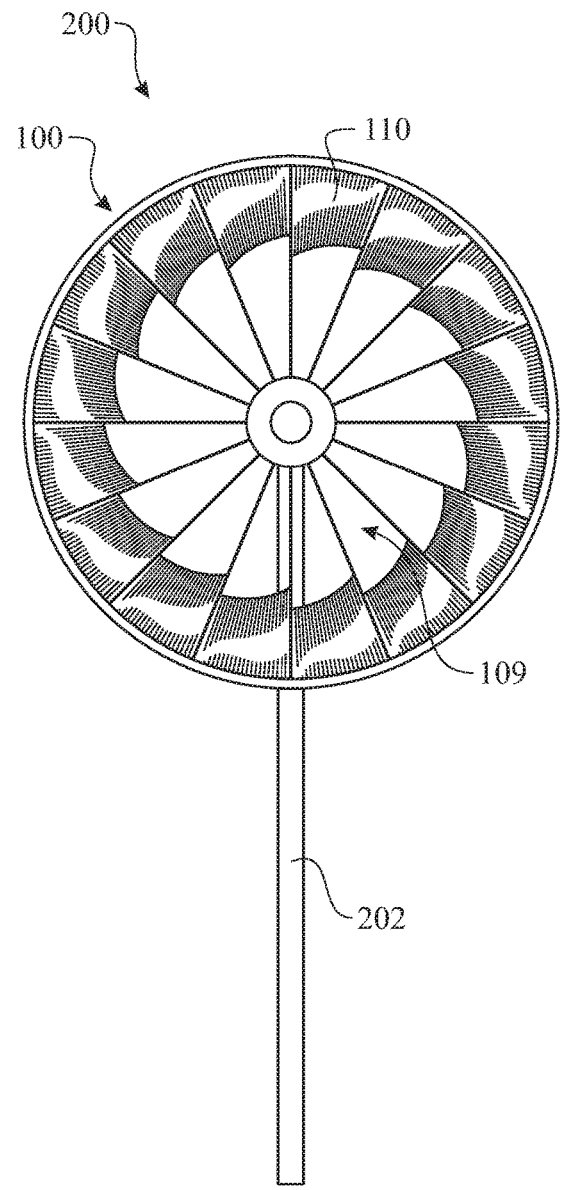
*FIG. 10*  *FIG. 11*

VEHICLE WITH TENSION WING ASSEMBLY

CROSS-REFERENCE TO RELATED APPLICATION

This Non-Provisional Utility Patent Application is a Continuation-In-Part Utility claiming the benefit of co-pending Non-Provisional Utility patent application Ser. No. 14/204,931, filed on Mar. 11, 2014, which is a Continuation-In-Part Utility claiming the benefit of co-pending Non-Provisional Utility patent application Ser. No. 12/825,857, filed on Jun. 29, 2010 (Issued as U.S. Pat. No. 8,668,455 on Mar. 11, 2014), which is a Continuation-In-Part Utility claiming the benefit of co-pending U.S. Non-Provisional patent application Ser. No. 12/496,769, filed on Jul. 2, 2009, (Issued as U.S. Pat. No. 7,775,760 on Aug. 17, 2010), all of which are incorporated herein in their entireties.

FIELD OF THE INVENTION

The present disclosure generally relates to an apparatus and method for converting wind or water flow to electrical energy. More particularly, the present disclosure relates to a turbine wheel having a plurality of blades disposed about an internal edge of a peripheral rim.

BACKGROUND OF THE INVENTION

Windmills and other wind driven turbines generally comprise a series of blades projecting radially from a centrally located hub. This configuration provides several limitations. A first limitation is efficiency. The energy utilized to turn an object is referred to as torque. The torque is calculated at a force times a distance from the center of rotation. The force applied near the center of rotation has a significantly lower impact than a force applied towards the outer edge of the blades, although resistance is created along the entire length of the blade. A second limitation is the potential injury or death to birds. Turbines of common windmills have a plurality of blades, which are spatially configured, allowing birds to fly between the swirling turbines. This poses a risk whereby one of the blades could collide with the passing bird.

A first known blade discloses a rotor blade, which includes a main blade and an extension nap, which is translationally moveable relative to the main blade. The main blade and transition blade at least form an airfoil lifting surface of the entire blade. The dimension of the airfoil lifting surface is variable by translationally moving the extension flap relative to the main blade.

A second known reference discloses self starting vertical-axis wind turbine, for economically competitive power production by driving large grid-corrected AC generators. The wind turbine includes a variable blade pitch-angle from 0 to 60 degrees, wherein the blades following variable wind speed for maximum efficiency and to keep constant turbine speed; a variable blade camber to optimize lift-to-drag ratio, controlled by pitch and cyclical variation of incidence-angle; improved airfoil shape of cambered blades; low cost automatic gear-train for two constant turbine speeds; protection against overload and prevention of power surge during wind gusts; low stress three-legged high tower assembled with nacelle and tail structure on ground level. This enables a tower to be built to any height required to harness maximum wind energy.

Yet another known embodiment discloses a wind or water flow energy converter that includes a wind or water flow actuated rotor assembly. The rotor includes a plurality of blades; the blades of are variable in length to provide a variable diameter rotor. The rotor diameter is controlled to fully extend the rotor at low flow velocity and to retract the rotor, as flow velocity increases such that the loads delivered by or exerted upon the rotor do not exceed set limits.

While another known embodiment discloses a rotation shaft which is installed in the center of a wind turbine. Blades are secured to the rotation shaft to be circumferentially spaced apart one from another. Each blade has a lattice composed of transverse lattice elements and longitudinal lattice elements which are plaited to cooperatively define a plurality of spaces. In each space, a rotation adjustment piece is coupled to a first portion of a lattice element to be capable of rotating between a closing position where it closes a predetermined number of the spaces and an opening position where it opens a predetermined number of the spaces, so that the blades as a whole can be rotated irrespective of a wind direction. Electricity is generated using wind applied to the rotation shaft through rotation adjustment pieces.

And another known embodiment discloses a multi-axis turbine with an external upper covering, a tower structure with a plurality of vertical elongated members connected to each other with supporting horizontal elongated members, and a plurality of smaller blades on a rotation connected to a tower structure with a plurality of the rotation. One embodiment includes impact impellers connected to a rotation creating a swept area with a height to diameter ratio of greater than four. In one embodiment the impact impellers are connected to a rotation means thereby creating a swept area with a height to diameter ratio of greater than ten.

While another embodiment discloses a power plant which extracts energy from a free flowing fluid by means of a transverse mounted generator with its rotor extending downward into the flow. Runner blades with hinges attain the greatest surface area when the flow is tangent to and in the same direction as the rotor rotation. The hinges fold the runner blades to minimize the surface area proportional to drag when the blades oppose the flow. The generator with feedback control charges batteries, produces hydrogen fuel by electrolysis of water, or further couples to a DC motor coupled to an AC generator. Other features optionally perform such tasks as adaptively locating the generator in the maximum velocity flow, controlling and communicating the state of charge of the battery, or gauging and controlling the electrolysis process and communicating the fullness of the hydrogen gas output tanks.

Yet another embodiment discloses a design of a wind turbine blade and a wind turbine by which the power, loads and/or stability of a wind turbine may be controlled by typically fast variation of the geometry of the blades using active geometry control (e.g. smart materials or by embedded mechanical actuators), or using passive geometry control (e.g. changes arising from loading and/or deformation of the blade) or by a combination of the two methods. A method of controlling the wind turbine is also disclosed.

While another embodiment discloses a wind turbine system, which incorporates a variable blade assembly including adjustable sails and wing shaped masts expanding the wind velocity capture envelope. The blade assembly turns a hydraulic pump, which pressurizes fluid and stores the pressurized fluid in a chamber in the support tower. Pressurized fluid is directed via an electronically controllable proportioning valve to a hydraulic motor, which is coupled to an electric generator. A computer control module operates the proportioning valve regulating pressure to the hydraulic motor, maintaining generator rotational speed, and providing consistent output frequency to the power grid. Stored energy in the high pressure tank is used to continue generator operation after the winds cease, allowing early warning notification to the power management system of impending power loss. Residual pressure maintained in the high pressure tank allows restart operations via hydraulic pressure rather than power grid energy drain. On site high energy capacitors store additional energy.

And another embodiment discloses a wind turbine capable of varying active annular plane area by composing such that blades are attached to a cylindrical rotor movable in the radial direction of the rotor, the blades being reciprocated in the radial direction by means of a blade shifting mechanism connected to the root of each blade, or the blade itself is divided so that the outer one of the divided blade is movable in the radial direction. With this construction, the: wind turbine can be operated with a maximum output within the range of evading fatigue failure of the blades and rotor by adjusting the active annular plane area in accordance with wind speed.

Common windmills comprise a plurality (generally three) of masts or blades extending from a central hub. The design of the blades must be structurally sound to accommodate the applied forces. This requirement dictates a heavier construction to the masts or blades. The heavy construction increases the inertial force, which reduces the rotational speed of the turbine assembly. The mass of material increases the cost of fabrication, transport, and the like to the site. Alternately, exotic materials and structural designs can be used to reduce the weight, while increasing cost and complexity of fabrication.

Wind studies show that as the velocity of the wind doubles, the power of the wind or water is cubed. Thus, if a turbine at 12 MPH wind generates 10 watts of power, at 24 MPH it will produce 1,000 watts of power.

A turbine will increase speed as the velocity of the air or water is sped up. The power of a generator is also increased as the rotational speed is increased. The power of the generator is not necessarily the same power curve of the turbine driving the generator. Therefore, losses can be expected because of the power mismatch between turbine and generator.

The described device monitors the rpm of a generator either directly or indirectly and provides a value, which corresponds to the rpm of the turbine. This in turn, is used to determining the amount of load (power) to be generated.

The angle difference of wing and wind is known as the Angle Of Attack (AOA). Experiments have determined that the optimum AOA is approximately 28° in a "climb angle" for a blade or wing. The closer the AOA can be to the 28°, the more power that can be generated. Two methods can be used to keep this angle of attack (AOA) constant. One is to pivot the blades to make the proper angle. This would keep the RPM of the turbine rather constant. The changing of the blade angle is used on large turbines. The other method to have the AOA stable is to change the rpm of the turbine.

Therefore, a wind driven turbine wheel with improved efficiency and a focus on bird safety is needed. The method described below is to change the rpm and the power extracted to keep the blades of the turbine at the optimum AOA for maximum power generation. The method described will better fit small turbines with a diameter of perhaps no more than 150 feet.

SUMMARY OF THE INVENTION

The present disclosure is generally directed to a wind driven turbine, and more specifically to a turbine blade having a peripheral rim assembled to a central hub via a plurality of spokes. A series of airfoil blades are disposed along an interior edge of the peripheral rim, being rotationally attached to the plurality of spokes. The blades leave an airflow breach between an interior edge of the blade and the central hub.

A wing provides lift in order to make heavier than air vehicles possible. The other use for a wing is to provide the ability to propel a vehicle such as an airplane. The wing, in a lifting or propulsion application is commonly referred to as a propeller or turbine.

The following are some characteristics of wings:
1. A larger wing will provide more lift than a small wing.
2. A wing that has high velocity up to close to the speed of sound will provide more lift than wings moving slower.
3. A wing that has the proper shape will provide more lift than others with different shapes.
4. A lighter wing will have less mass, and thus will be able to provide more lift than a heavier wing due to the limitations of the vehicle weight and the mass of the propeller.

Thus, to provide a superior lifting wing or propeller, all the above items must be considered to provide the maximum ability to provide lift. Wings attached to an airplane travel at the same speed as the airplane. Wings, when employed as propellers, have many different speeds, depending on where the point of reference is made away from the hub or axis of rotation.

On any circle, thirty percent (30%) of a circle on the outer portion of the circle will have fifty percent (50%) of the volume of the circle. On a propeller, the outer thirty percent (30%) has the fastest moving part of the propeller. Thus, by combining the area and the velocity of the propeller, the outer thirty percent (30%) of the circle will provide almost 100% of the possible lift made. If the outer thirty percent (30%) of the propeller blade can be made larger than most propellers, additional lift provided can be substantial.

The problem is that as a lever is made longer, the shear forces become too large for the propeller to bear.

The tension wing provides answers to all of the above as follows:
1. Multiple winglets are placed only on the outer portion of the wing.
2. The outer portion of the circle provides the velocity to provide the maximum lift.
3. No change is necessary on optimum shape of the winglets, so existing wing shape technology can be used.
4. A bicycle wheel is the lightest, strongest, most efficient rotating device known. The Tension Wing uses this embodiment of proven engineering to make a more efficient, lighter, more powerful rotating wing or propeller.

The tension wing allows more power to be input to the wing, and allows more lift to be provided.

In some embodiments, the wind turbine apparatus may include:
a peripheral rim having a rim radius defined from a rim center to an interior edge of the rim;

a central hub having a hub radius defined from a hub center to an exterior edge of the hub;

a radial span dimension being defined as rim radius minus the hub radius;

a plurality of spokes assembling the central hub to a rotationally centralized position within the peripheral rim; and a series of blades having a radial length being significantly less than the radial span dimension;

wherein the each of the blades is assembled to the wind turbine apparatus positioning the blades within the peripheral ring and proximate the interior edge of the rim, leaving an airflow gap between an interior edge of the blades and the exterior edge of the hub.

In a second aspect, a leading edge of the blade is rotationally assembled to a spoke.

In another aspect, a trailing edge is assembled to the spoke via an adjusting mechanism.

In yet another aspect, the adjusting mechanism is operationally controlled via a feature within the respective spoke.

In yet another aspect, the adjusting mechanism is operationally controlled via a feature within the respective spoke by rotating the spoke or a member within the spoke.

In yet another aspect the plurality of spokes is configured having two adjacent spokes overlapping.

In yet further aspect, the adjusting mechanism is operationally controlled via a tension member, which is provided through a hollow portion of the spoke and controlled via a winding mechanism located proximate or within the central hub.

In yet another aspect, the trailing edge is assembled to a spoke via a breakaway mechanism.

In yet another aspect, the breakaway mechanism further comprises a means for automatically restoring the trailing edge to an operable configuration.

In yet aspect, breakaway mechanism is integrated with the adjusting mechanism.

In yet another aspect, the turbine wheel engages with an electrical power generator, with the assembly being positioned upon a vertical riser support.

In yet another aspect, the deployed turbine wheel can include a counterbalance assembly.

In yet another aspect, the deployed assembly can additionally include a rotational means, rotating about a vertical axis to reduce the frontal area respective to the airflow.

In yet another aspect, the turbine wheel comprises a plurality of masts extending radially from an axle, each mast comprising a blade. The masts are supported via a planar tension cable spanning between distal ends of adjacent masts and a radial tension cable spanning between the distal end of each mast and each of the two ends of the axle.

In yet another aspect, the blades can be replaceable with one's having different shapes, sizes, surface areas, and aerodynamic characteristics.

In a second embodiment, the wind turbine apparatus may include:

a vertical riser support extending upward from a supporting surface;

a turbine housing carried by the vertical riser support;

a wind driven turbine blade subassembly in operational communication with a turbine shaft;

a hydraulic pump carried by the turbine housing and in operational communication with the turbine shaft;

a hydraulic motor comprising a hydraulic motor drive shaft, wherein the hydraulic motor is distally located from the turbine housing and in hydraulic communication with the hydraulic pump through hydraulic lines; and an electrical power generator comprising a generator drive shaft in rotational communication with the hydraulic motor drive shaft, wherein rotation of the wind driven turbine blade subassembly rotationally drives the hydraulic pump, wherein the hydraulic pump flows hydraulic fluid through the hydraulic lines to the hydraulic motor, wherein the hydraulic fluid flowing through the hydraulic lines drives rotation of the hydraulic motor;

wherein the hydraulic motor drives rotation of the electric power generator, which outputs electric power.

In yet another aspect, the electrical output of the electric power generator is governed by an electric power output controller module.

In yet another aspect, the electric power output controller module varies a resistance of a current flow.

In yet another aspect, the electric power output controller module varies a resistance of a current flow, optimizing power generation efficiency and power output.

In yet another aspect, the electric power output controller module identifies a rotational speed of the hydraulic motor drive shaft and varies a resistance of a current flow based upon a predetermined rotational speed of the hydraulic motor drive shaft.

In yet another aspect, the electric power output controller module identifies a rotational speed of the generator drive shaft and varies a resistance of a current flow based upon a predetermined rotational speed of the generator drive shaft.

In another arrangement, the wind operated electrical power generating system may include:

a wind turbine comprising a turbine blade assembly attached to a turbine blade subassembly shaft, the turbine blade subassembly shaft being rotationally carried by a turbine housing, the turbine housing being supported by a vertical riser support structure;

a generator in one of direct and indirect operational communication with the turbine blade subassembly shaft, wherein rotation of the turbine blade subassembly shaft provides power to rotate an input shaft of the generator;

a rotational speed sensor arranged to sense a rotational speed of one of the turbine blade subassembly shaft and the generator shaft;

an electrical controller circuit in signal communication with the rotational speed sensor, wherein the electrical controller circuit identifies when a rotational speed determined by a signal from the rotational speed sensor is proximate a predetermined speed; and a potentiometer, wherein the electric potentiometer increases a load upon the generator.

In yet another aspect, the system further comprises a power control module, wherein the power control module contains the electrical controller circuit and the potentiometer, wherein the potentiometer is a manually adjusted potentiometer.

In yet another aspect, the electrical controller circuit further comprising at least one speed indicator, wherein each of the at least one speed indicator alerts a user when the electrical controller circuit identifies when a rotational speed determined by a signal from the rotational speed sensor is proximate a predetermined speed associated with each of the at least one speed indicator.

In yet another aspect, the electrical controller circuit further comprises a plurality of speed indicators, wherein one of the plurality of speed indicators alerts a user when the electrical controller circuit identifies when a rotational speed determined by a signal from the rotational speed sensor is proximate a predetermined speed associated with the one of the plurality of speed indicators.

In yet another aspect, the electrical controller circuit further comprises:
- a power control module, wherein the power control module contains:
  - the electrical controller circuit, which further includes a plurality of speed indicators, wherein one of the plurality of speed indicators alerts a user when the electrical controller circuit identifies when a rotational speed determined by a signal from the rotational speed sensor is proximate a predetermined speed associated with the one of the plurality of speed indicators; and
  - a plurality of the potentiometers, wherein each of the plurality of potentiometers is associated with a respective speed indicator of the plurality of speed indicators.

In yet another aspect, the electrical controller circuit further comprises a transformer integrated in electric communication between the potentiometer and a grid tie.

In an alternate application, the turbine wheel assembly can be modified and employed to provide lift, the tension lifting wing wheel assembly comprising:
- a peripheral rim having a rim radius defined from a rim center to an interior edge of the rim;
- a central hub having a hub radius defined from a hub center to an exterior edge of the hub;
- a radial span dimension being defined as rim radius minus the hub radius;
- a plurality of spokes assembling the central hub to a rotationally centralized position within the peripheral rim; and
- a series of wings, each wing having an aerodynamically lifting shape extending between a leading edge and a trailing edge,
- wherein the each wing of the series of wings is assembled to the tension lifting wing wheel assembly by coupling an area of the wing proximate the leading edge to a leading edge spoke and an area of the wing proximate the trailing edge to a trailing edge spoke,
- wherein the wings are arranged having a gap provided between the wing trailing edge of each forward located wing and the wing leading edge of each trailing located wing.

In a second aspect, the leading edge spoke and the trailing edge spoke are substantially parallel to one another.

In another aspect, wing is twisted along a transverse axis, wherein the transverse axis extends between a distal or outer edge of the wing and a proximal or hub edge of the wing.

In yet another aspect, each spoke can cross other spokes defining three crossover locations.

In yet another aspect, the spokes can be formed having at least one of: a circular cross section shape, an aerodynamic cross section shape, or any other suitable cross section shape.

In yet another aspect, the spokes can be arranged alternating between extending from an outer surface of each hub flange and from an inner surface of the same hub flange.

In yet another aspect, the tension lifting wing wheel assembly can include a total of 36 spokes, 18 spokes per hub flange.

In yet another aspect, each spoke would preferably be assembled to the tension lifting wing wheel assembly having substantially equal tension.

In yet another aspect, tension can be applied to and retained within each spoke by a tension application system.

In yet another aspect, any suitable tensioning system or combination of tensioning systems can be employed.

In yet another aspect, one tension application system employs a spoke distal assembly tensioning nipple securing a threaded distal or rim end of the spoke to the rim.

In yet another aspect, a second tension application system employs a spoke proximal or hub assembly tensioning nipple securing a threaded proximal or hub end of the spoke to the hub. In one implementation, the proximal end of the spoke would be inserted through a hole or bore formed through a bracket or other axially extending feature. A threaded tensioning element would be threadably secured to the threaded proximal end of the spoke. The threaded tensioning element would be adjusted to increase or decrease the tension of the respective spoke.

In yet another aspect, a third tension application system employs a threaded coupling element securing a first centrally threaded section of a first segment of the spoke to a second centrally threaded section of a second segment of the spoke. The threaded segments would include threading in opposite directions. More specifically, the first centrally threaded section would including threading formed in a first rotational direction and the second centrally threaded section would including threading formed in a second, opposite rotational direction. The threaded coupling element would be formed having mating threading to each of the first centrally threaded section and the second centrally threaded section.

In another aspect, the spoke hub attachment holes can be even spaced about the hub flange. Alternatively, the spoke hub attachment holes can be arranged in pairs, wherein the pairs are arranged having a first spacing and each adjacent pair is arranged having a second spacing about the hub flange, wherein the first spacing and the second spacing differ from one another.

In another aspect, the series of spoke hub attachment holes of the tension lifting wing first center hub flange and the series of spoke hub attachment holes of the tension lifting wing second center hub flange are offset from one another.

In another aspect, the thickness or axial height of the tension lifting wing outer rim is determined by maximizing the desired strength of the tension lifting wing outer rim, while providing sufficient area to support a connection of each spoke.

In another aspect, the attachment locations of each spoke along an interior surface of the tension lifting wing outer rim are linear with one another. Alternatively, the attachment locations of each spoke along an interior surface of the tension lifting wing outer rim are located in an alternating configuration.

In another aspect, the tension lifting wing central hub assembly is preferably substantially centered axially respective to the tension lifting wing outer rim. Alternatively, the tension lifting wing central hub assembly can be offset axially respective to the tension lifting wing outer rim.

In another aspect, the angle of attack can be established by the arrangement of the, the height or span of the tension lifting wing central hub assembly, or the like, or any combination thereof.

In another aspect, the greater the height of hub or the span between the hub flanges, the greater the angle of attack.

In yet another aspect, the tension lifting wing wheel assembly can be rotationally driven by a rotational drive machine, such as a motor, an engine, a turbine, and the like.

In yet another aspect, the rotationally driven tension lifting wing wheel assembly can be integrated into a vehicle to provide at least one of lift and propulsion.

In yet another aspect, the rotationally driven tension lifting wing wheel assembly can be integrated into a vehicle in a substantially vertical orientation to provide propulsion to the vehicle.

In yet another aspect, the rotationally driven tension lifting wing wheel assembly can be integrated into a vehicle in a substantially horizontal orientation to provide lift to the vehicle.

In another application, a heavy-lift helicopter comprising:
a heavy-lift helicopter body;
at least one rotational drive machine carried by said heavy-lift helicopter body;
a tension lifting wing wheel assembly including:
  a peripheral rim having a rim radius defined from a rim center to an interior edge of the rim;
  a central hub having a hub radius defined from a hub center to an exterior edge of the hub;
  a radial span dimension being defined as rim radius minus the hub radius;
  a plurality of spokes assembling the central hub to a rotationally centralized position within the peripheral rim; and
  a series of wings, each wing having a aerodynamically lifting shape extending between a leading edge and a trailing edge,
  wherein the each wing of the series of wings is assembled to the tension lifting wing wheel assembly by coupling an area of the wing proximate the leading edge to a leading edge spoke and an area of the wing proximate the trailing edge to a trailing edge spoke,
  wherein the wings are arranged having a gap provided between the wing trailing edge of each forward located wing and the wing leading edge of each trailing located wing,
wherein each of the at least one tension lifting wing wheel assembly is assembled to a respective at least one rotational drive machine.

In a second aspect, the heavy-lift helicopter is a tandem rotor heavy-lift helicopter, comprising a pair of rotational drive machines supported by the body, each rotational drive machine having a respective tension lifting wing wheel assembly attached thereto.

In another aspect, the heavy-lift helicopter includes at least one of one horizontally oriented tension lifting wing wheel assembly and one vertically oriented tension lifting wing wheel assembly.

An optional feature of the tension wheel assembly is a spoke breakaway feature. The spoke breakaway feature is preferably integrated at a location along the spoke proximate the rim.

In a second aspect, the spoke can include one or more spoke breakaway features.

In another aspect, the spoke breakaway feature retains the spoke in an assembled configuration when the spoke is subjected to a tensile force (tension).

In yet another aspect, the spoke breakaway feature releases or decouples the spoke from the assembly when the tension is removed from the spoke.

In yet another aspect, the spoke breakaway feature includes a nipple flange or spoke flange formed or provided at a breakaway end of the spoke.

In yet another aspect, the spoke breakaway feature includes a tension generating feature.

In yet another aspect, the tension generating feature is provided in a form of a nipple assembly.

In yet another aspect, the spoke breakaway feature includes a nipple assembly comprising a nipple body and a nipple flange.

In yet another aspect, the nipple body includes a threaded section (male or female threading).

In yet another aspect, the nipple body includes a threaded section (male or female threading), wherein the threading of the threaded section is sized to mate with a mating threading (female or male threading) formed on the associated end of the spoke.

In yet another aspect, the nipple body includes a threaded interior bore.

In yet another aspect, the nipple body includes a threaded interior bore, wherein the threading of the threaded interior bore is sized to mate with a mating threading formed on the associated end of the spoke.

In yet another aspect, the spoke breakaway feature includes a stud assembly comprising a stud trunk and a stud flange.

In yet another aspect, the stud trunk is mechanically coupled to the rim.

In yet another aspect, the stud trunk is mechanically affixed to the rim.

In yet another aspect, the stud trunk is mechanically coupled to the hub.

In yet another aspect, the stud trunk is mechanically affixed to the hub.

In yet another aspect, the stud trunk is mechanically coupled to at least one of the rim and the hub.

In yet another aspect, the stud trunk is mechanically affixed to at least one of the rim and the hub.

In yet another aspect, the spoke breakaway feature includes a coupling element that bridges a nipple flange and a stud flange into a single assembly while tension is applied to the spoke.

In yet another aspect, the coupling element comprises at least two separate elements.

In yet another aspect, the coupling element comprises at least two separate elements hingeably assembled with one another.

In yet another aspect, the spoke breakaway feature includes an embossed surface mating with a debossed surface to retain mechanical communication between the coupling element and the nipple flange.

In yet another aspect, the spoke breakaway feature includes an embossed surface mating with a debossed surface to retain mechanical communication between the coupling element and the stud flange.

In yet another aspect, each surface of the coupling assembly applying a compression force is formed having an embossed surface.

In yet another aspect, each surface of the coupling assembly receiving the compression force is formed having a debossed surface.

In yet another aspect, the embossed surface is convex.

In yet another aspect, the debossed surface is concave.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, where like numerals denote like elements and in which:

FIG. 10 presents an elevation side view of a turbine wheel integrated into a wind power harnessing structure;

FIG. 11 presents an elevation front view of the wind power harnessing structure of FIG. 10;

Like reference numerals refer to like parts throughout the several views of the drawings.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description.

Figure 1:
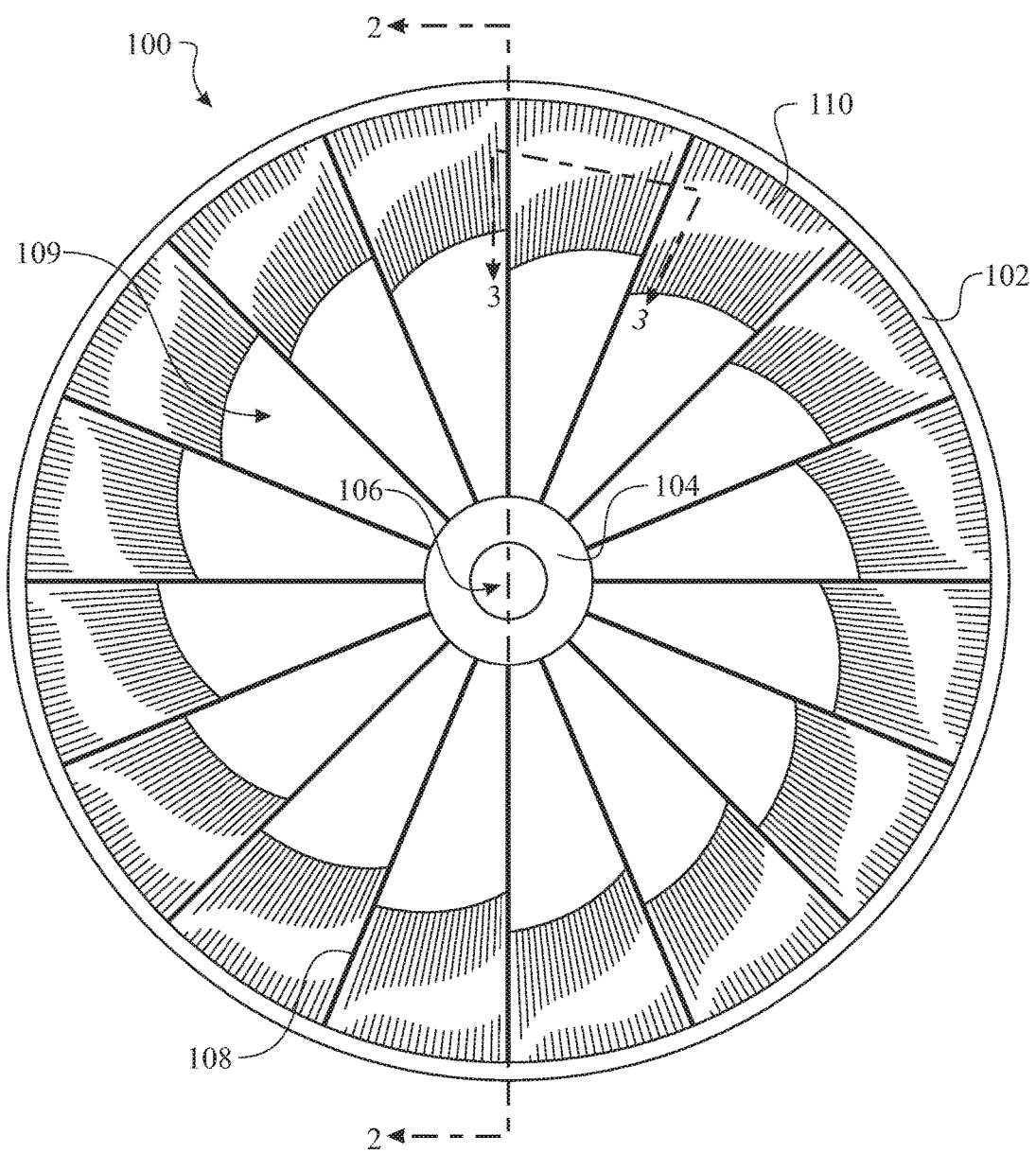
FIG. 1 presents a front view of an exemplary embodiment of a turbine wheel illustrating the general components of the present invention.

For purposes of description herein, the terms "upper", "lower", "left", "rear", "right", "front", "vertical", "horizontal", and derivatives thereof shall relate to the invention as oriented in FIG. 1, where applicable. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure is generally directed to a turbine wheel 100 and the integration of the turbine wheel 100 onto a turbine deployment assembly 200. The turbine wheel 100 and the respective application are detailed hereinafter.

Figure 2:
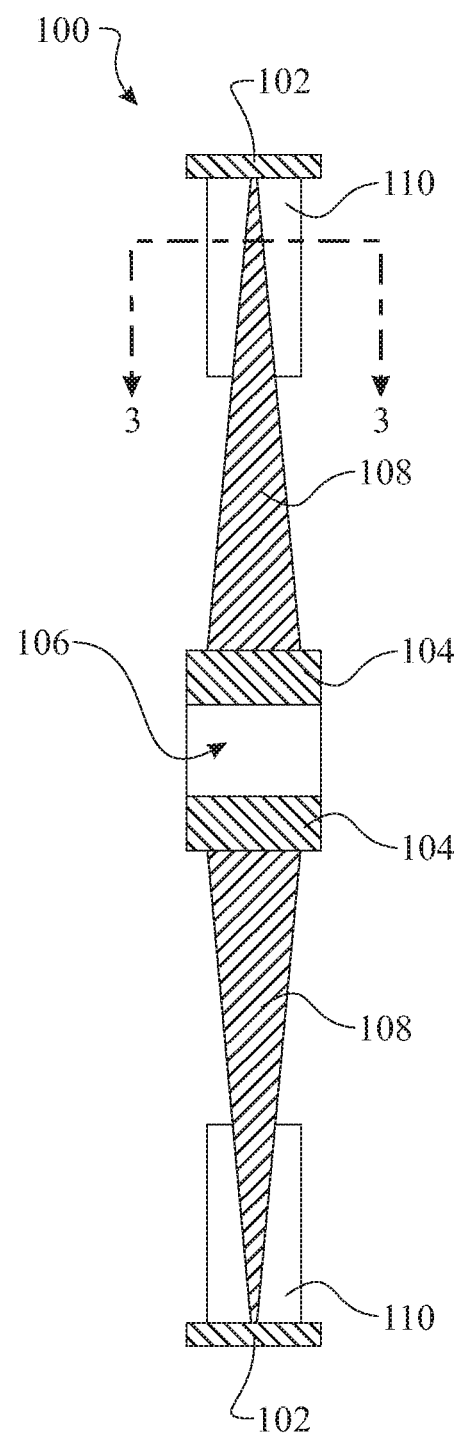
FIG. 2 presents a sectional side view of the turbine wheel taken along section line 2-2 of FIG. 1.
Figure 3:
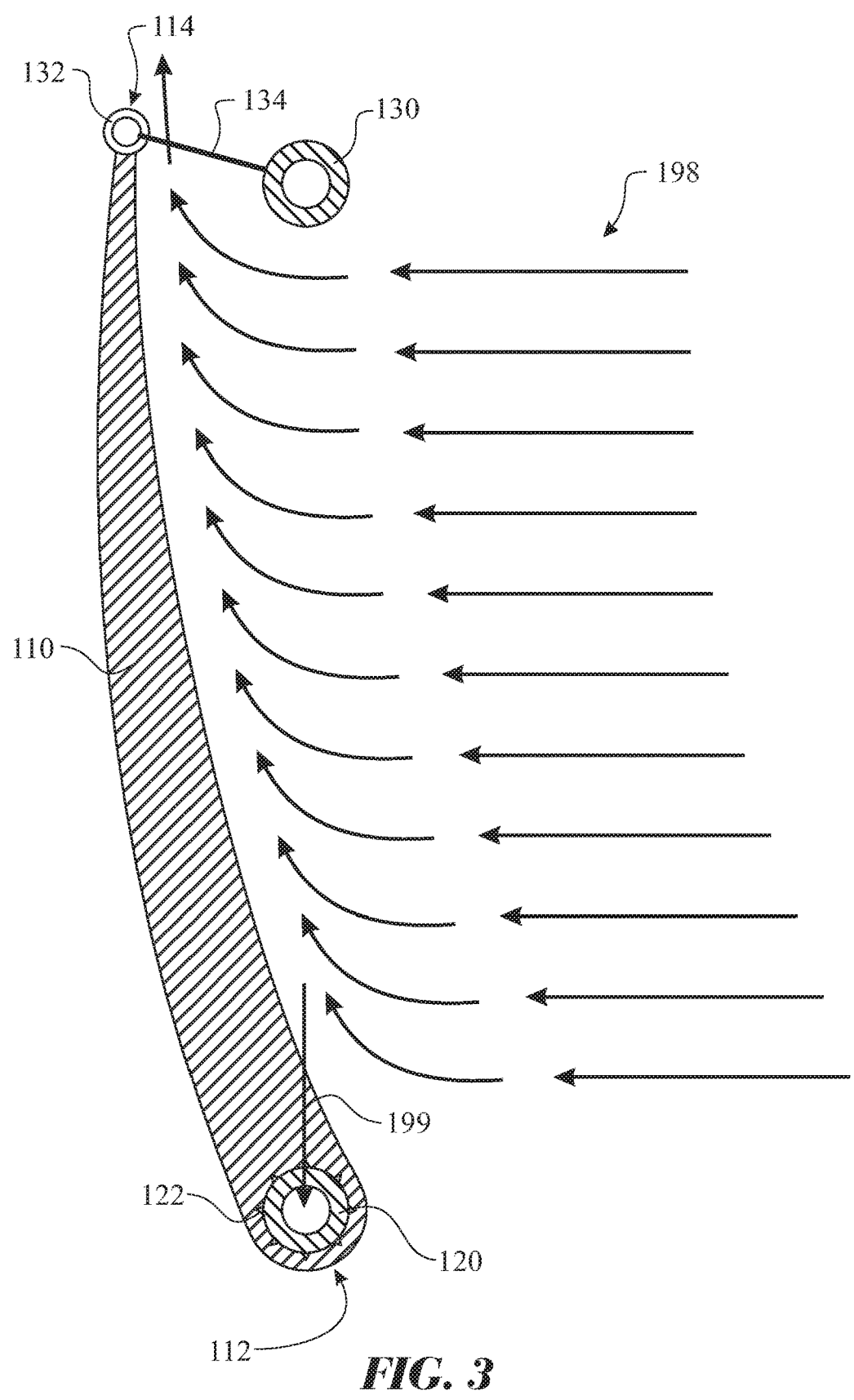
FIG. 3 presents a sectional end view of a turbine blade taken along section line 3-3 of FIG. 1 introducing an effect of wind flow on the blade.

Referring initially to FIGS. 1 through 3 of the drawings, an illustrative embodiment of a turbine wheel, hereinafter apparatus, is generally indicated by reference numeral 100 in FIG. 1. The turbine wheel assembly 100 includes a turbine center hub 104 being centrally assembled to a turbine outer rim 102 via a plurality of turbine spokes 108. The turbine center hub 104 includes an axle bearing 106, which is centrally assembled, allowing the turbine center hub 104 to rotate about an axle that would be assembled to the axle bearing 106. The axle and axle bearing 106 can be of any known rotational interface capable of supporting the forces exerted by the wind and respective motion of the turbine wheel assembly 100 about the axle. The turbine spokes 108 are preferably assembled having a tensile force. The distributed tensile force ensures the turbine outer rim 102 remains in the circular shape, while reinforcing the assembly.

A series of turbine blades 110 are provided, having a blade leading edge 112 and a blade trailing edge 114. The distance between the blade leading edge 112 and the blade trailing edge 114 is preferably equal to or greater than a span between two adjacent spokes 108. This shape allows for the blade leading edge 112 to be assembled to a respective lead turbine spoke 108 and the blade trailing edge 114 to be assembled to the respective trailing turbine spoke 108. It would be preferable that the blade leading edge 112 be pivotally assembled to a blade leading edge pivot 120, wherein the blade leading edge pivot 120 can be utilized as the lead turbine spoke 108. The blade leading edge pivot 120 can include a hollow centerline, allowing the turbine spoke 108 to be inserted therethrough. A plurality of anti-slip interface 122 can be included ensuring the blade leading edge pivot 120 rotates in conjunction with the turbine blades 110, or excluded allowing the blade leading edge pivot 120 to rotate independently respective to the turbine blades 110.

The turbine blades 110 has a length parallel to the turbine spoke 108 that is significantly shorter than the distance between the exterior of the turbine center hub 104 and the interior of the turbine outer rim 102. This provides an airflow interior region 109 within an interior of the turbine outer rim 102 allowing airflow 198 to pass through the turbine wheel assembly 100. This configuration provides a centroid of the effective force closer to the turbine outer rim 102, thus increasing the generated torque, reduces the rotational resistance, thus increasing the efficiency.

The trailing edge can include an incident angle control mechanism, including an incident angle controller 130, an angle control cleat 132 and an angle control tether 134. In the exemplary embodiment, the turbine blade 110 pivots about the blade leading edge pivot 120 and is retained at an incident angle via the angle control tether 134. The angle control tether 134 is a cabling, which is released or retracted via an incident angle controller 130. The incident angle controller 130 can either rotate to adjust a released length of the angle control tether 134, or the angle control tether 134 can be routed through the incident angle controller 130 and released or retracted via a remotely located winding mechanism (not shown, but well understood as a motor, gearing and spool). The angle control tether 134 is secured to the turbine blades 110 via an angle control cleat 132 located proximate the blade trailing edge 114 of the turbine blades 110.

Figure 4:
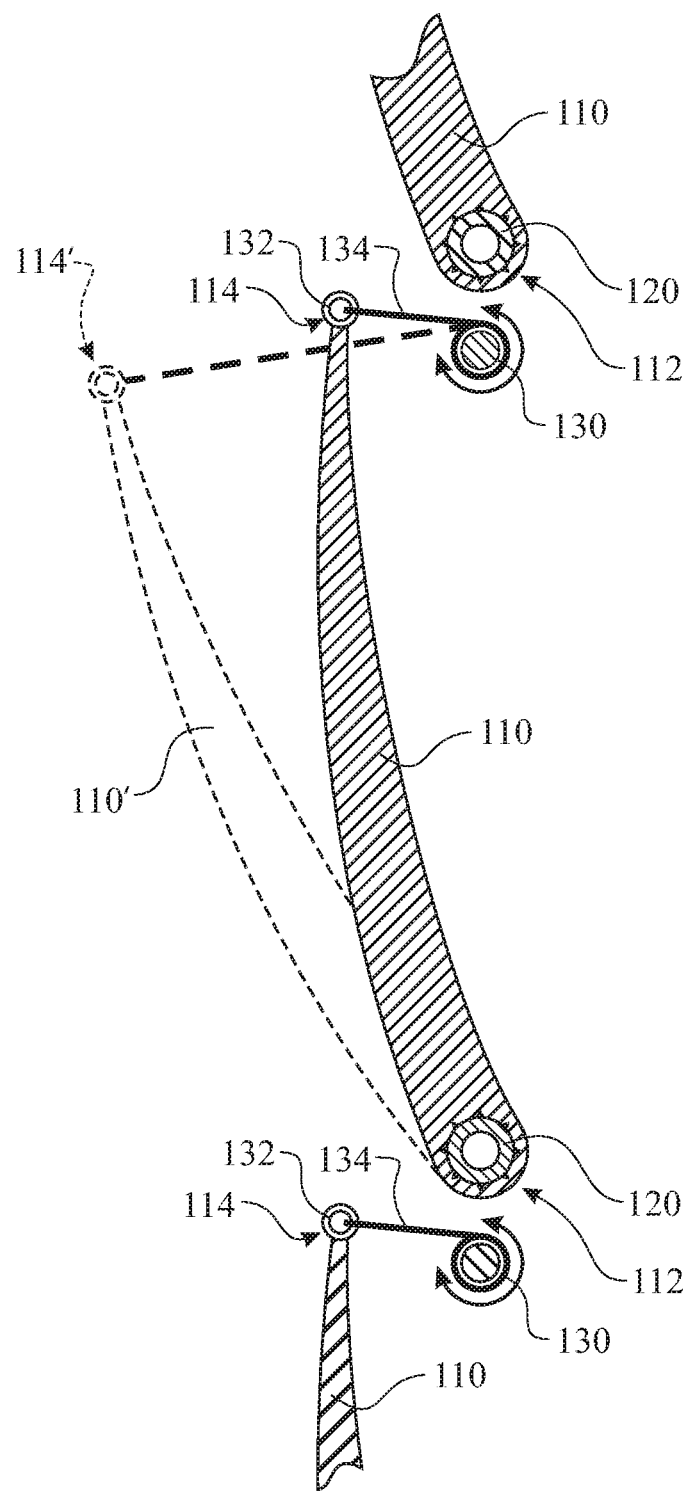
FIG. 4 presents a sectional end view of a series of turbine blades introducing an incident angle controlling mechanism.

As the incident angle controller 130 releases the angle control tether 134, a wind flow 198 applies a force to the facing side of the turbine blades 110 allowing the turbine blades 110 to rotate into position turbine blades 110' and repositioning the blade trailing edge 114 to position blade trailing edge 114' as shown in FIG. 4. The illustration presents an embodiment where the incident angle controller 130 is solid and rotates to release or retract the angle control tether 134 to adjust the released length. The angle of incident changes the resultant rotational speed of the turbine blades 110, as referenced as a resultant blade motion 199. The turbine blades 110 are positioned having the blade leading edge 112 overlapping the blade trailing edge 114, with the blade leading edge 112 being arranged on the wind receiving side of the turbine blades 110.

It is understood that other incident angle control mechanisms can be used, including a cam and respective control arm, and the like.

Figure 5:
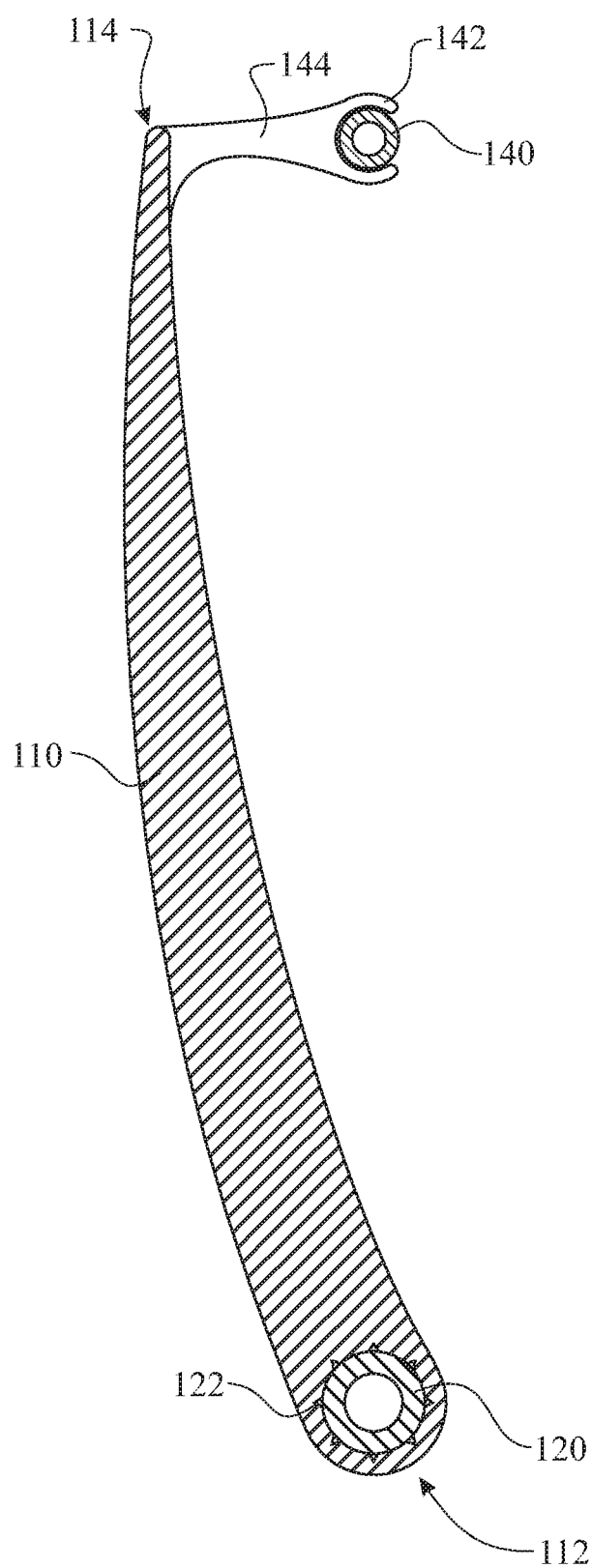
FIG. 5 presents a sectional end view of a turbine blade introducing an exemplary breakaway mechanism.
Figure 6:
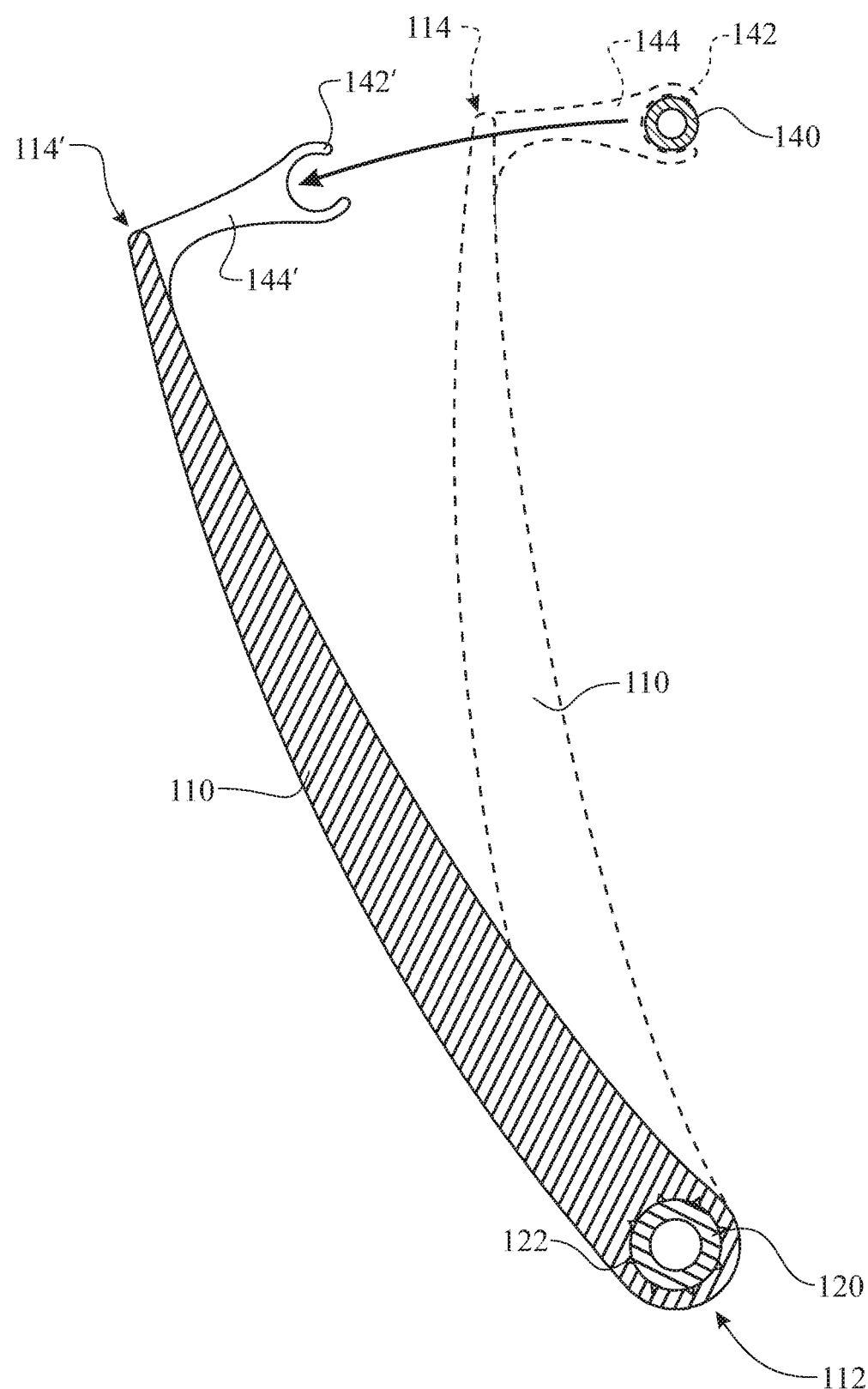
FIG. 6 presents a sectional end view of a turbine blade illustrating the operation of the breakaway mechanism of FIG. 5.

A breakaway mechanism can be incorporated to compensate when the turbine wheel assembly 100 encounters any unexpected excessive wind forces 198. One exemplary embodiment is presented in FIGS. 5 and 6. The breakaway mechanism detachably engages a breakaway clip 142 with a breakaway anchor 140. The breakaway clip 142 is secured to the blade trailing edge 114 via a breakaway frame 144. The breakaway clip 142 would detach from the breakaway anchor 140 when subjected to a predetermined force. An alternate configuration would utilize the incident angle mechanism of FIGS. 3 and 4. The incident angle controller 130 would include a ratcheting mechanism, which releases or free spools the angle control tether 134 when subjected to a predetermined force. It is understood that other configurations known by those skilled in the art can be integrated with the turbine wheel assembly 100, providing a breakaway mechanism.

Figure 7:
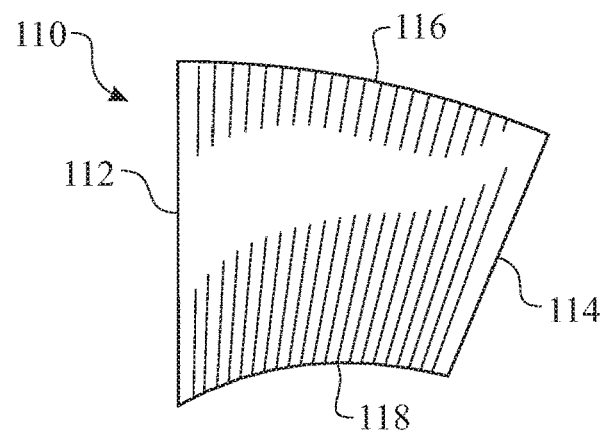
FIG. 7 presents a front view of a first exemplary turbine blade shape.
Figure 8:
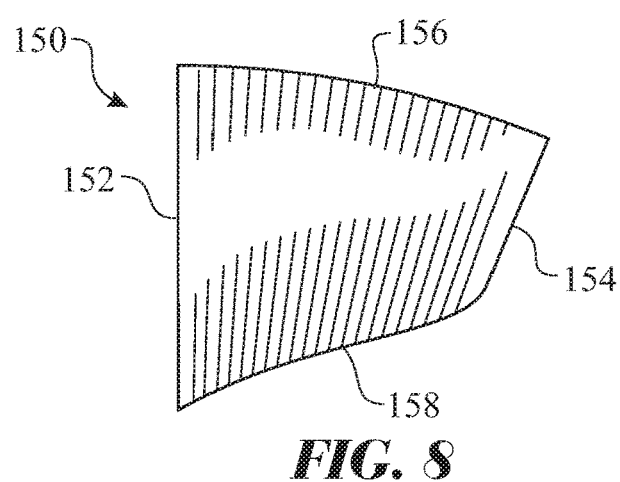
FIG. 8 presents a front view of a second exemplary turbine blade shape.
Figure 9:
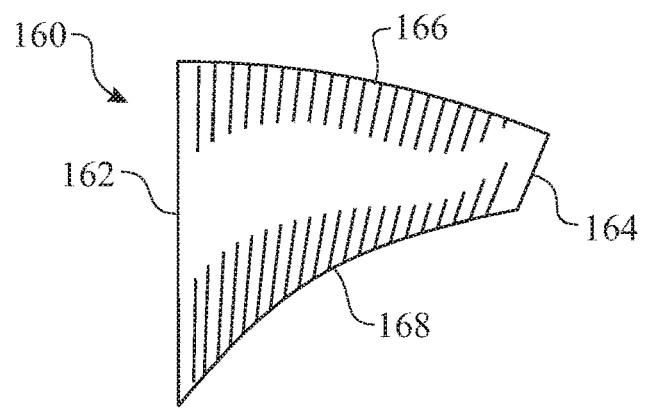
FIG. 9 presents a front view of a third exemplary turbine blade shape.

The turbine blades can be configured in a variety of shapes, as illustrated in FIGS. 7 through 9. A planar view of the turbine blades 110 is presented in FIG. 7, having an airfoil cross sectional shape bounded by a blade leading edge 112, a blade trailing edge 114, a posterior edge 116 and an interior edge 118. The turbine blades can be configured of a variety of cross sectional and peripheral shapes. The configuration defines the total surface area. The surface area, cross sectional shapes and peripheral shape all affect the efficiency of the turbine blades 110. The interior edge 118 provides an arched lower edge wherein the blade trailing edge 114 is equal to or slightly shorter than the blade leading edge 112. A planar view of a turbine blade 150 is presented in FIG. 8, having an airfoil cross sectional shape bounded by a blade leading edge 152, a blade trailing edge 154, a posterior edge 156 and an interior edge 158. The interior edge 158 provides an "S" shaped lower edge having a continuous line blending into the blade trailing edge 114, and wherein the blade trailing edge 114 is shorter than the blade leading edge 112. A planar view of a turbine blade 160 is presented in FIG. 9, having an airfoil cross sectional shape bounded by a blade leading edge 162, a blade trailing edge 164, a posterior edge 166 and an interior edge 168. The interior edge 168 provides an arched shaped lower edge wherein the blade trailing edge 164 is significantly shorter than the blade leading edge 162.

A turbine deployment assembly 200 is illustrated in FIGS. 10 through 15. A vertical riser support 202 provides a base member for the turbine deployment assembly 200. An electrical power generator 204 is pivotally assembled to the upper portion of the vertical riser support 202. The turbine wheel assembly 100 is in rotational communication with the electrical power generator 204 via a turbine wheel shaft 206. A counterbalance 210 can be incorporated providing a counterbalance to the turbine wheel assembly 100. The counterbalance 210 would be assembled to the turbine deployment assembly 200 via a counterbalance support beam 212.

Figure 12:
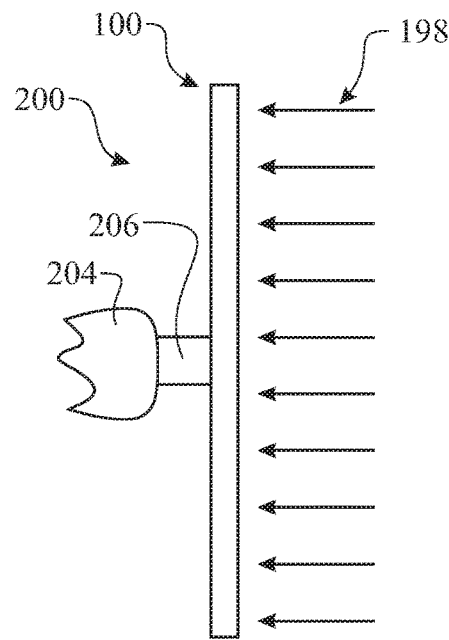
FIG. 12 presents a partial top view of the wind power harnessing structure of FIG. 10, configured perpendicular to an airflow.
Figure 13:
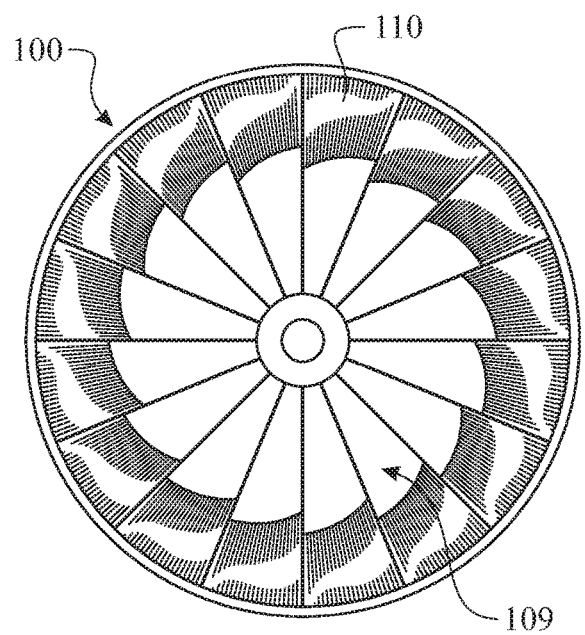
FIG. 13 presents a front view of the turbine wheel configured perpendicular to the airflow.
Figure 14:
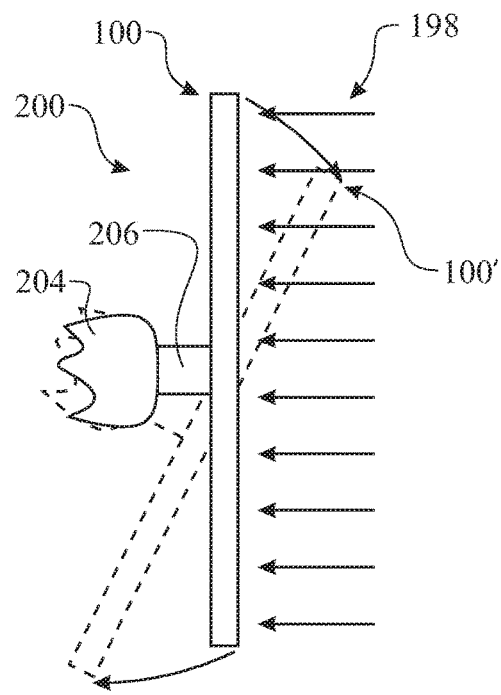
FIG. 14 presents a partial top view of the wind power harnessing structure of FIG. 10, rotated away from being perpendicular to the airflow.
Figure 15:
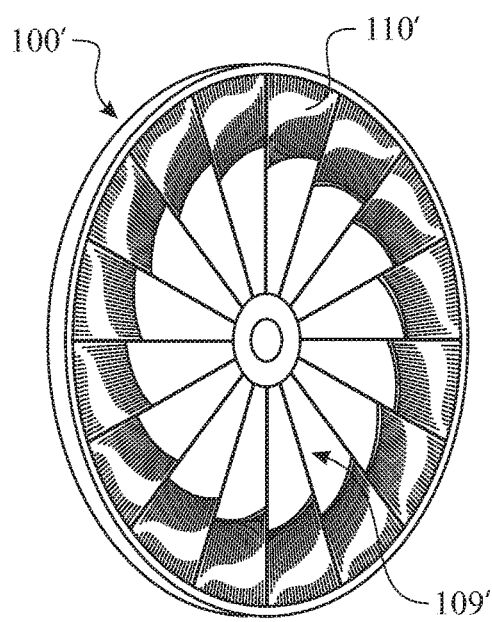
FIG. 15 presents a front view of the turbine wheel, rotated away from being perpendicular to the airflow.

The electrical power generator 204 is designed to rotate about a vertical axis parallel to a longitudinal axis of the vertical riser support 202 as shown in the top views of FIG. 14. The rotation positions the turbine wheel assembly 100 to rotated position turbine wheel assembly 100'. The rotation allows for several capabilities. The first, being positioning the turbine wheel assembly 100 perpendicular to the wind flow 198 as shown in FIG. 12, thus maximizing the frontal surface area as illustrated in FIG. 13. The second, being positioning the turbine wheel assembly 100 at an angle that is not perpendicular to the wind flow 198 as shown in FIG. 14, thus reducing the frontal surface area exposed to the wind flow 198 as illustrated in FIG. 15. This reduces any potential damage from excessive winds. The incident angle mechanism and the breakaway mechanism both additionally contribute to efficiency, reliability, and protection of the turbine deployment assembly 200.

Figure 16:
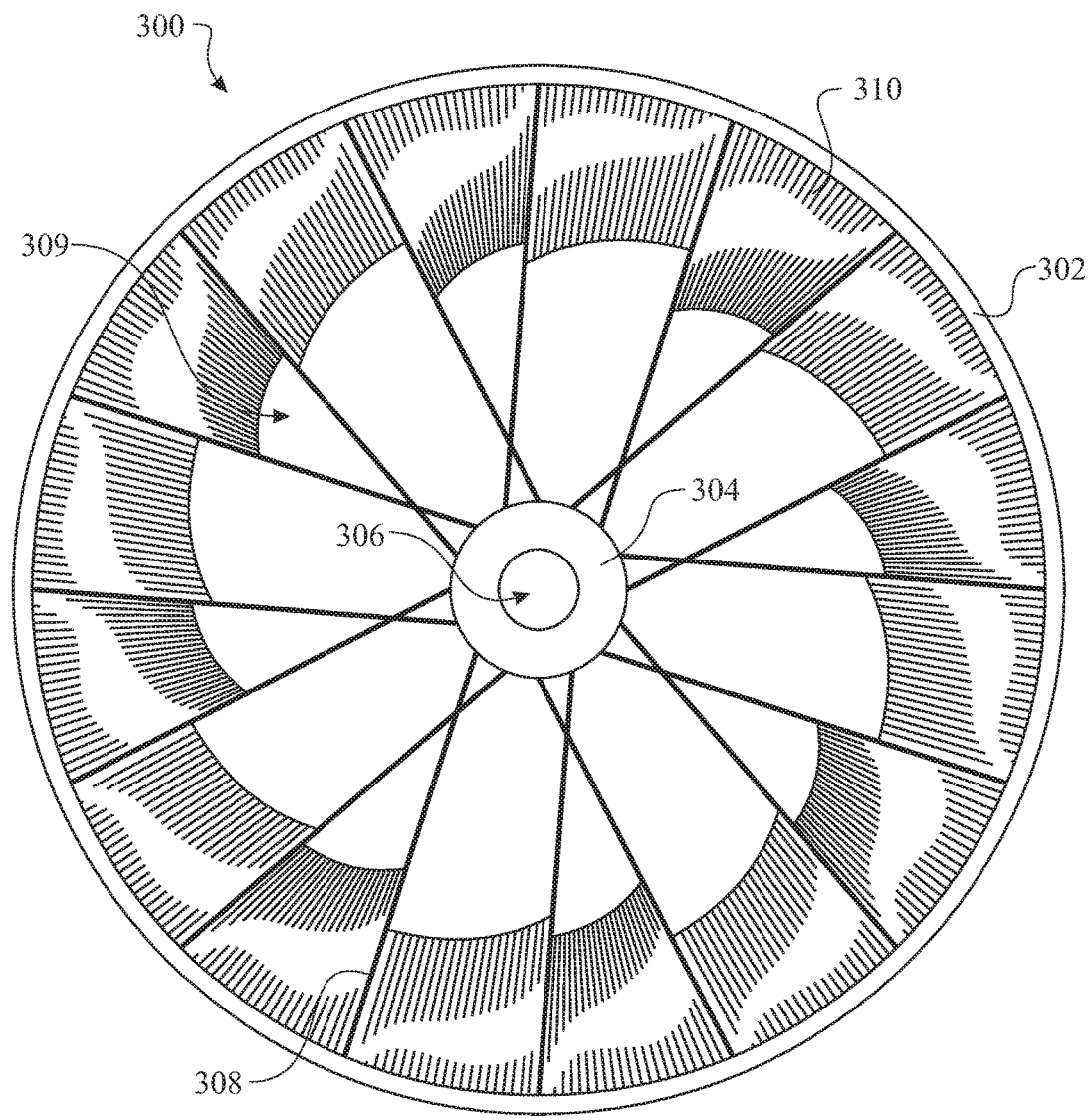
FIG. 16 presents a front view of a second exemplary embodiment of a turbine wheel assembling adjacent spokes in an overlapping configuration.

An alternate spoke configuration is presented in the exemplary embodiment referred to as a crossover spoke turbine wheel assembly 300, illustrated in FIG. 16. The crossover spoke turbine wheel assembly 300 is similar to the turbine wheel assembly 100. Like features of crossover spoke turbine wheel assembly 300 and turbine wheel assembly 100 are numbered the same except preceded by the numeral '3'. The turbine spokes 308 are arranged being fixed to the center hub 304 offset from the radial centerline. The turbine spokes 308 are configured whereby adjacent turbine spokes 308 overlap. The overlap between the spokes 308 occurs proximate the center hub 304.

Figure 17:
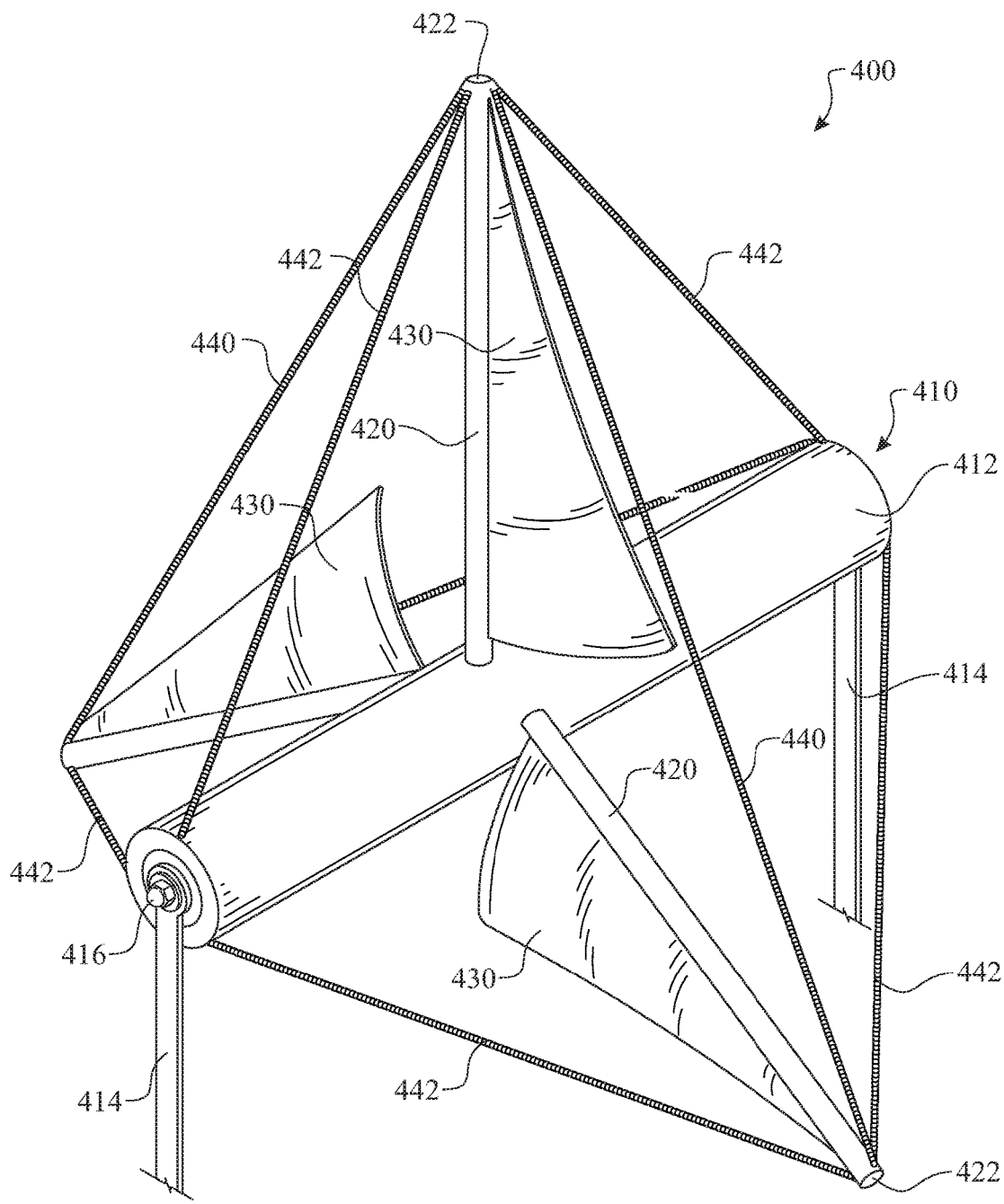
FIG. 17 presents an isometric view of a third exemplary embodiment of a turbine wheel utilizing a plurality of masts supported by an arrangement of tension cables.
Figure 18:
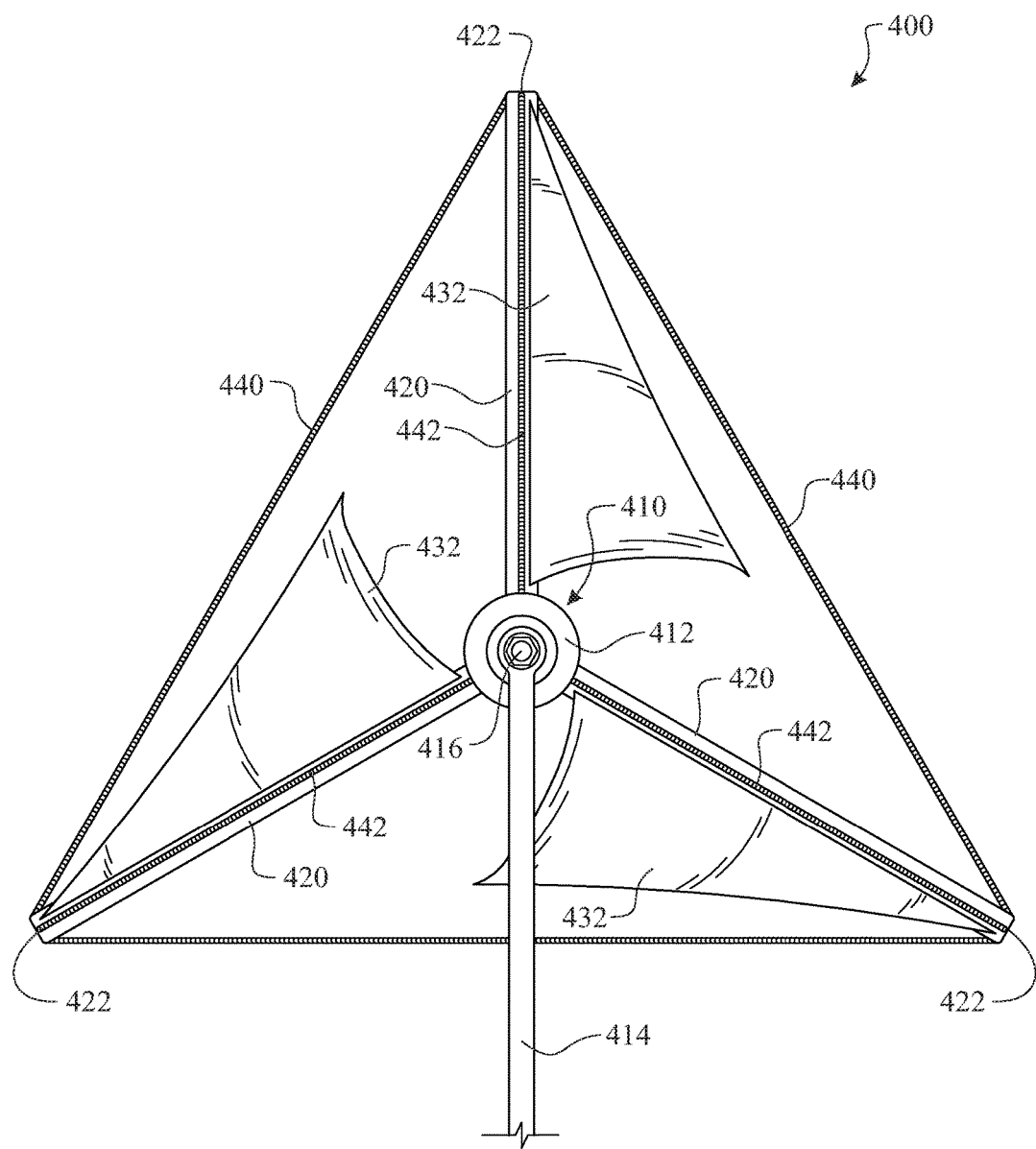
FIG. 18 presents a front elevation view of the third exemplary turbine wheel of FIG. 18.
Figure 19:
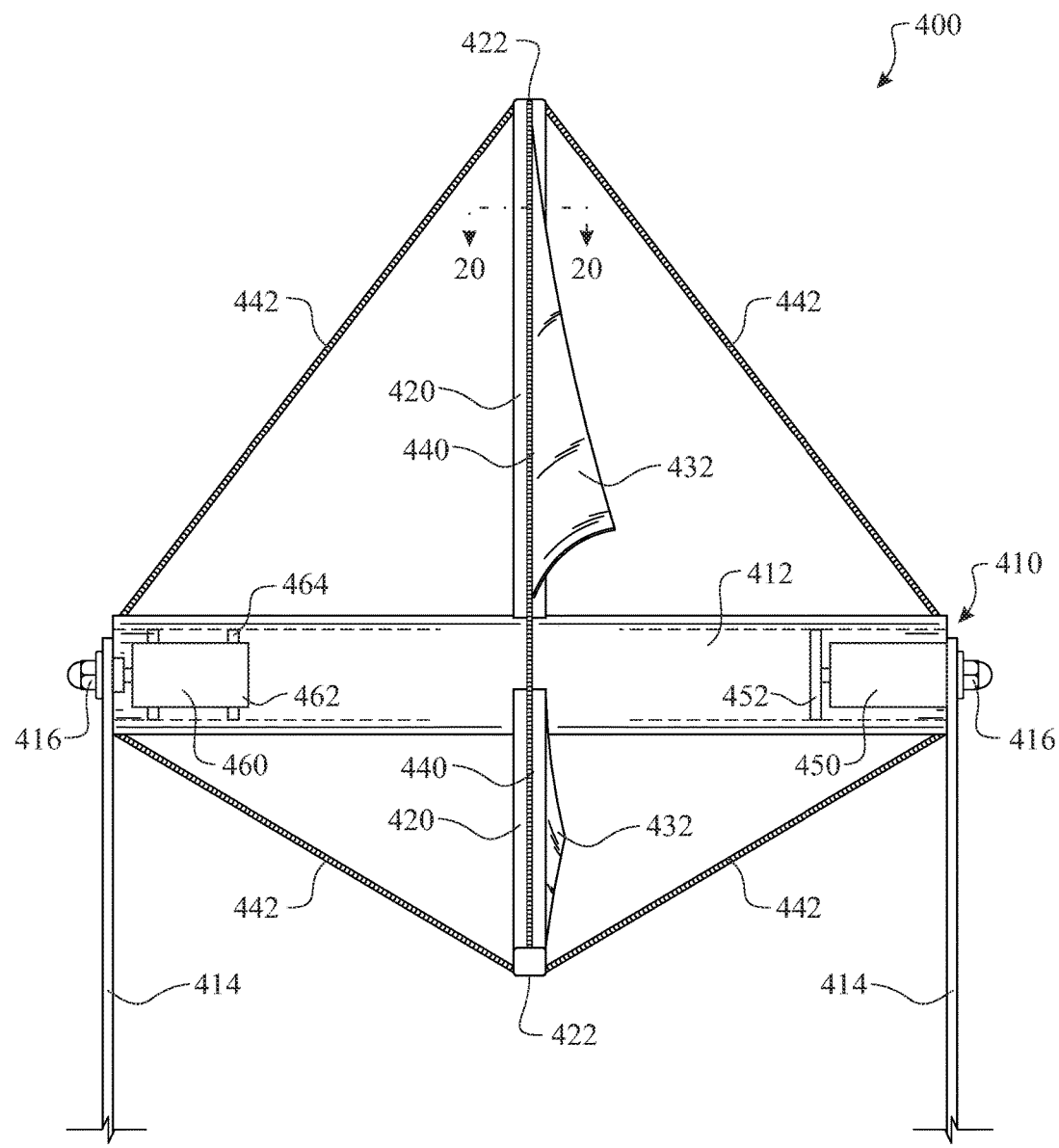
FIG. 19 presents a side elevation view of the third exemplary turbine wheel of FIG. 18.

Another exemplary embodiment is referred to as a cable supported mast turbine assembly 400, illustrated in FIGS. 17 through 19. The cable supported mast turbine assembly 400 is fabricated having a plurality of mast 420 extending radially from a central hub 412 of a power generating central hub assembly 410. The central hub 412 is supported by a pair of hub support members 414; having one hub support member 414 located at each end of the central hub 412. The central hub 412 is rotationally assembled to the hub support member 414 via a hub coupling member 416. A generator is provided in communication with the central hub 412, being placed within the central hub 412, adjacent to the central hub 412, or any other reasonable location. As the central hub 412 rotates, the generator creates electrical power. It is also understood that the rotational motion of the central hub 412 can be mechanically coupled to other objects to drive a motion of the other objects accordingly.

The masts 420 are supported by an arrangement of cabling. Mast-to-mast tension cables 440 span between mast distal ends 422 of each adjacent mast 420. Each mast-to-mast tension cable 440 is tightened having a tensile force equal to the others. The mast-to-mast tension cables 440 provide stability to the mast 420 against a torsional force generated by the rotation of the central hub 412. A mast-to-axle tension cable 442 spans between each end of the central hub 412 and the mast distal end 422 of each of the masts 420. The plurality of mast-to-axle tension cables 442 provides stability against any cross-directed forces, such as wind, vibrations, and the like.

The cables 440, 442 can be secured to the respective member using any reasonable and well-known interface. The interface can include a tensioning member, such as a turnbuckle, and the like. The cables 440, 442 can be fabricated using any of many well-known methods, including a single cable, a series of wrapped or bound smaller cables, and the like. The cross-sectional shape of the mast 420 are preferably aerodynamic, such as round (as shown), wing-shaped, and the like.

A turbine blade can be provided as either a pliant turbine blade 430 or a rigid turbine blade 432. When incorporating the pliant turbine blade 430, the cable supported mast turbine assembly 400 can include a tether or blade tensioning cable 444 spanning between an unattached corner or other region of the pliant turbine blade 430 and a location proximate an axial end of the central hub 412. The blade tensioning cable 444 can be fixed or adjustable. A motor can be utilized to retract or extend the blade tensioning cable 444, adjusting the tautness of the blade tensioning cable 444. A tensioning member can release the blade tensioning cable 444 should the blade tensioning cable 444 be subjected to a force above a predetermined limit, thus avoiding any damage to the cable supported mast turbine assembly 400.

Alternately, the rigid turbine blade 432 can be rigidly affixed to the mast 420. The mast 420 can be pivotally attached to the central hub 412, including a drive mechanism for rotating the mast 420, thus adjusting the angle of incidence of the pliant turbine blade 430.

Figure 20:
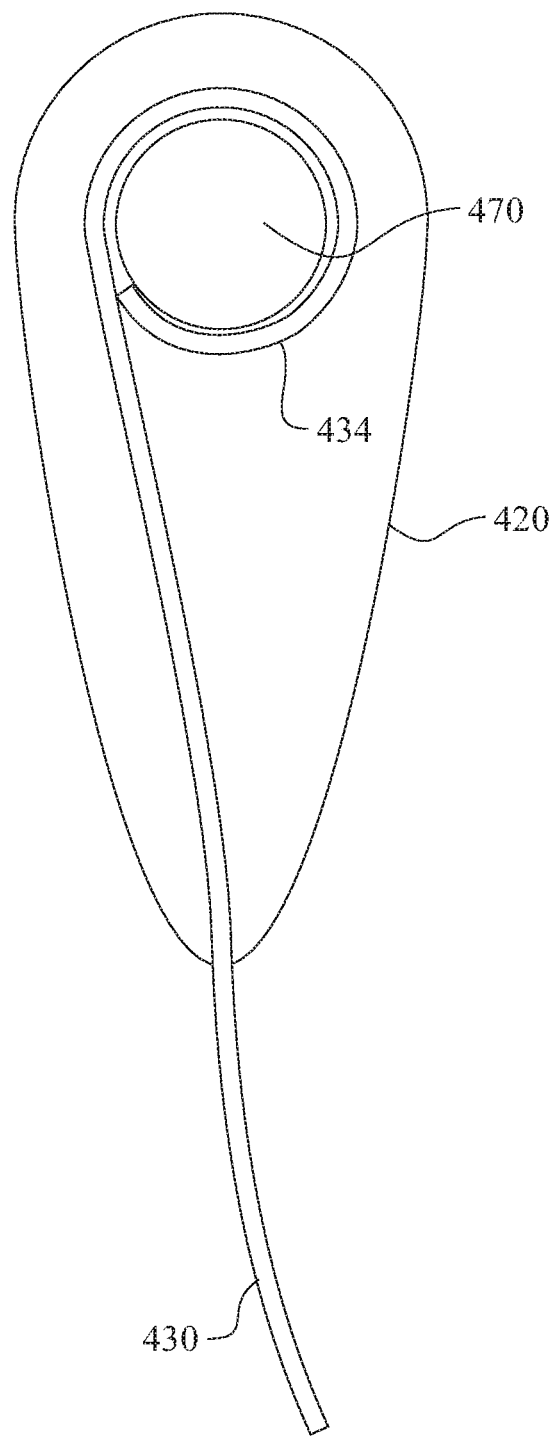
FIG. 20 presents a cross sectional view of the mast taken along section line 20-20 of FIG. 19, the illustration additionally introducing a blade retracting mechanism.

Any additional operational features of the turbine wheel assembly 100 can be applied to the cable supported mast turbine assembly 400. The mast 420 can include a hollow center, allowing the user to retract at least a portion of the pliant turbine blade 430 therein to reduce the exposed surface area thereof as illustrated in FIG. 20. A retracting mechanism 470 can be provided to gather the pliant turbine blade 430 within an interior section of the mast 420. One such means would be to rotate the retracting mechanism 470 collecting the pliant turbine blade 430, storing the excess material in a wrap referenced as a retracted turbine blade portion 434. The retracting mechanism 470 can be an elongated rotating structure such as an axle rotated by a motor or other rotational operating device.

The cable supported mast turbine assembly 400 is provided as a means for generating power. The cable supported mast turbine assembly 400 is designed whereby the central hub 412 is rotated by wind. The rotation of the central hub 412 is then converted into useable energy. A mechanical interface can engage with the central hub 412 to transfer mechanical power to drive a secondary apparatus. The mechanical interface can direct mechanical motion of a secondary apparatus. Alternately, an electricity generating apparatus 450 can engage with the central hub 412 to create electrical power. The electricity generating apparatus 450 can be located within an interior of the central hub 412 or external to the central hub 412. One portion of the electricity generating apparatus 450 remains stable and a second portion of the electricity generating apparatus 450 engages with the central hub 412 to rotate. The rotating motion drives the electricity generating apparatus 450 to create the electrical output. As illustrated on the right side of FIG. 19, the electricity generating apparatus 450 is secured to the hub support member 414. A generator interface 452 is attached to an axle of the electricity generating apparatus 450 and engages with an interior surface of the central hub 412. The central hub 412 rotationally drives the generator interface 452. The generator interface 452 rotates windings of a generator, which pass across fixed stators creating the electrical output. Conversely, as illustrated on the left side of FIG. 19, an electricity generating apparatus 460 can be secured to the interior surface of the central hub 412 via a generator mount 464. A generator interface 462 is attached to a fixed member, such as the hub support member 414. The motion of the central hub 412 causes the electricity generating apparatus 460 to rotate respective to the generator interface 462, thus generating the electrical output.

The turbine assemblies 100, 400 can be utilized for gas flow, such as gaseous flows, such as wind, or fluid flows, such as wave motion, currents, tidal flow, and the like. It is also understood that the turbine assembly 100, 400 can be attached to a moving object. The turbine assembly 100, 400 creates an output power based upon the relative motion between the turbine assembly 100, 400 and a fluid (either gaseous or liquid).

The previously described embodiments integrate the electric power generator 204, 450, 460 into the power generating central hub assembly 410 of the turbine assembly 200, 400. Electric power generators 204, 450, 460 are generally heavy, wherein the weight impacts the structural design and directional rotatability of the turbine assembly 200, 400.

Figure 21:
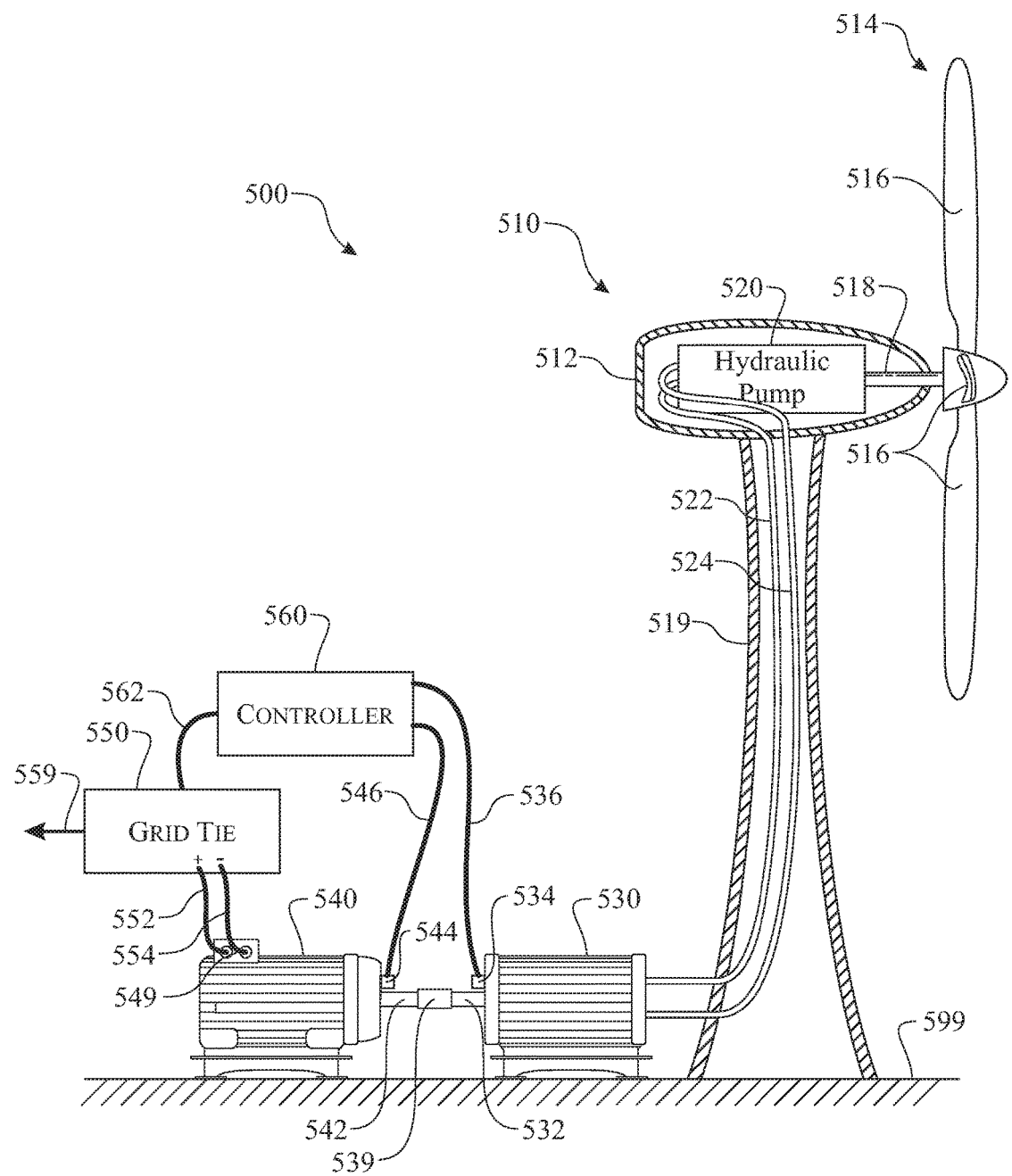
FIG. 21 presents a partially sectioned view of an exemplary wind operated electrical power generating system employing a hydraulic power transfer system and a power optimizing controller.

A wind operated electrical power generating system 500, as shown in an exemplary illustration presented in FIG. 21, introduces an alternative configuration for transferring wind energy to an electric generator 540. The wind operated electrical power generating system 500 employs a hydraulic system for transferring energy collected from wind to the electric generator 540. The wind operated electrical power generating system 500 includes a wind operated turbine assembly 510 for collecting energy from wind. The wind operated turbine assembly 510 includes a turbine housing 512 carried by a vertical riser support structure 519. The vertical riser support structure 519 is structurally supported by a system supporting surface 599. In a preferred configuration, the vertical riser support structure 519 is rigidly mounted to the system supporting surface 599. The system supporting surface 599 can be a cement slab; a natural earth surface, such as dirt, rocks, and the like; a wooden structure, a mobile vehicle, a floating vessel, and the like. The mounting configuration would be determined based upon the selected supporting material. The turbine housing 512 is preferably located atop a distal end of the vertical riser support structure 519. The turbine housing 512 includes various features required for operation of the wind operated turbine assembly 510. A turbine blade subassembly 514 is rotationally assembled to the turbine housing 512 using a turbine blade subassembly shaft 518. The turbine blade subassembly 514 can be of any suitable design, including a three blade 516 design as illustrated, the turbine wheel assembly 100, the crossover spoke turbine wheel assembly 300, the cable supported mast turbine assembly 400, and any other suitable wind power collecting design. The turbine housing 512 can be rigidly fixed to the vertical riser support structure 519 or rotationally carried by the vertical riser support structure 519. In a configuration where the turbine housing 512 is rotationally carried by the vertical riser support structure 519, the turbine housing 512 would rotate to optimize the directional relationship between the turbine blade subassembly 514 and the direction of the wind.

The hydraulic system includes a hydraulic pump 520 carried by the turbine housing 512, a hydraulic motor 530 distally located from the turbine housing 512 and preferably carried by the system supporting surface 599. A pair of hydraulic pipes, tubes or lines 522, 524 extends fluid communication between the hydraulic pump 520 and the hydraulic motor 530. The hydraulic lines 522, 524 can be routed within an interior of the vertical riser support structure 519, along an interior surface of the vertical riser support structure 519, along an exterior surface of the vertical riser support structure 519, or along any other supporting structure. The hydraulic lines 522, 524 can be fabricated of any suitable material. The hydraulic lines 522, 524 can be fabricated of a rigid material, such as PVC, copper, and the like, of a flexible material, such as plastic, nylon, rubber, and the like, or any combination thereof. The structure of the hydraulic lines 522, 524 can be rigid or include features to introduce flexure.

The hydraulic motor 530 is assembled in rotational communication with an electric generator 540. The hydraulic motor 530 includes a hydraulic motor shaft 532 that is rotationally driven by fluid flowing through the hydraulic lines 522, 524. The electric generator 540 includes an electric generator shaft 542, which is arranged in rotational communication with the hydraulic motor shaft 532 of the hydraulic motor 530. The hydraulic motor 530 and electric generator 540 are preferably rigidly mounted in a manner that provides and maintains dynamic alignment between the hydraulic motor shaft 532 and the electric generator shaft 542. In the exemplary embodiment, the hydraulic motor shaft 532 and the electric generator shaft 542 are coupled to one another using a shaft coupling 539. It is understood that the operational engagement can transfer a rotational force from the hydraulic motor shaft 532 to the electric generator shaft 542 using any suitable interface, including one or more gears, a clutch, a transmission, and the like.

A power control module 560 can be integrated into the wind operated electrical power generating system 500 to optimize power. The power control module 560 monitors the rotational speed of either shaft 532, 542. The wind operated electrical power generating system 500 can include at least one of a hydraulic motor shaft rotational speed sensor 534 and an electric generator shaft rotational speed sensor 544. The hydraulic motor shaft rotational speed sensor 534 would be arranged to monitor the rotational speed of the hydraulic motor shaft 532. A hydraulic motor shaft rotational speed sensor signal communication link 536 provides signal communication between the hydraulic motor shaft 532 and the power control module 560. The electric generator shaft rotational speed sensor 544 would be arranged to monitor the rotational speed of the electric generator shaft 542. An electric generator shaft rotational speed sensor signal communication link 546 provides signal communication between the electric generator shaft 542 and the power control module 560. The power control module 560 can operate using the hydraulic motor shaft rotational speed sensor 534, the electric generator shaft rotational speed sensor 544 or both. It is understood that the power control module 560 can include compensation information when gears, a transmission, or any other ratio translating interface is integrated between the hydraulic motor shaft 532 and the electric generator shaft 542.

The controller governs the power output from the electric generator 540 to a grid tie 550. The power control module 560 is in electric communication with the grid tie 550 using a power control module electrical communication link 562. Alternatively, the power control module 560 can be in electric communication with the electric generator 540 to accomplish the same end result.

Electrical power generated during operation of the electric generator 540 is transferred from the electric generator 540 through an electric output panel 549. In the exemplary embodiment, a pair of electrical output cables (a positive electrical output cable 552 and a negative electrical output cable 554) is used to provide electric communication between the electric generator 540 and the grid tie 550. The grid tie 550 provides electrical communication between at least one of the controller 560 and the generator 540 and an electric power grid 559. The generated electric power is transferred to a power grid 559 for use.

In operation, rotation of the turbine blade subassembly 514 is transferred to the hydraulic pump 520 by the turbine blade subassembly shaft 518. The rotational input to the hydraulic pump 520 generates a hydraulic fluid flowing down the first hydraulic line 522 and returning through the second hydraulic line 524. The hydraulic fluid flows through the hydraulic motor 530 causing the hydraulic motor 530 to rotate. The rotational motion of the hydraulic motor shaft 532 created by the hydraulic fluid flow drives a rotation of the electric generator shaft 542. The rotational motion of the electric generator shaft 542 powers the electric generator 540 to generate electric power. The electric power is fed to the electric output panel 549, which distributes the generated electric power through any number of electrical output cables 552, 554. It is understood that a grounding connection can be provided through a casing, frame, or other electrically conductive component of the electric generator 540.

Figure 22:
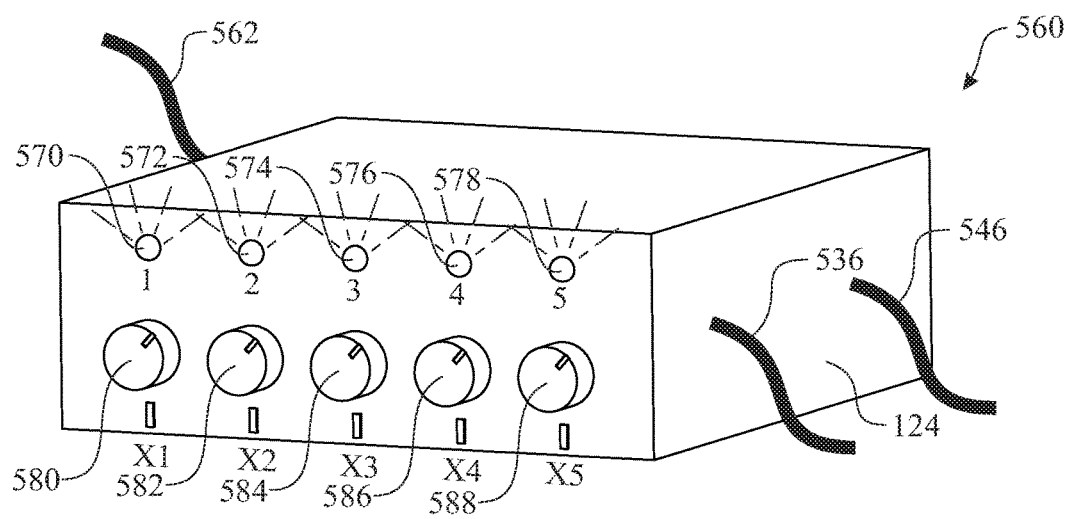
FIG. 22 presents an enlarged view of the power optimizing controller introduced in FIG. 21.

The power control module 560 is integrated into the wind operated electrical power generating system 500 to optimize or maximize electric output. Details of the power control module 560 are provided in FIG. 22. Integration of the power control module 560 is illustrated in an exemplary schematic diagram shown in FIG. 23.

The power control module 560 includes a circuit that monitors the rotational speed of either or both of the hydraulic motor shaft 532 and electric generator shaft 542 using the hydraulic motor shaft rotational speed sensor 534 and/or the electric generator shaft rotational speed sensor 544. The circuit includes a microprocessor, a digital memory device, at least one rotational speed indicator and at least one potentiometer 580, 582, 584, 586, 588, wherein each of the at least one potentiometer 580, 582, 584, 586, 588 is associated with a respective rotational speed indicator 570, 572, 574, 576, 578 of the at least one rotational speed indicator 570, 572, 574, 576, 578. The rotational speed indicator can be any suitable alert, including an audible alert, a visual alert, a transmitted message, a tactile alert, and the like, and any combination thereof. The audible alert can be a continuous audible signal, a cyclical or pulsed audible signal, a siren, and the like. The visual alert can be a continuously illuminated light, a flashing light, a light changing color, and the like. The light can be a Light Emitting Diode (LED), an incandescent bulb, a fluorescent bulb, and the like. A transmitted message can be a text message, an email, a broadcast message, an audible or recorded message, an audible message transmitted to a cellular phone, and the like.

Each employed rotational speed sensor 534, 544 is in signal communication with the microprocessor by any suitable communication element, including hardwired, wireless, magnetic communication, and the like, and any combination thereof. As the rotational speed of the shafts 532, 542 approach a predetermined rotational speed, the associated rotational speed indicator 570, 572, 574, 576, 578 changes state to alert an individual monitoring the system. The individual monitoring the system would subsequently adjust the associated potentiometer 580, 582, 584, 586, 588 to optimize the electric power output. Each of the rotational speed indicators 570, 572, 574, 576, 578 is associated with a specific predetermined rotational speed. It is understood that the predetermined rotational speed can be programmable, adjustable, or automatically determined by an algorithm programmed into the microprocessor/memory. The change in resistance is conveyed through the power control module electrical communication link 562. It is understood that any suitable circuitry can be employed to introduce the variable resistance from the associated potentiometer 580, 582, 584, 586, 588 into the electric circuit of the electric generator 540 and/or the grid tie 550, such as integration of a transformer 590. Although the exemplary power control module 560 presents a manual implementation, it is understood that the process can be automated.

Figure 23:
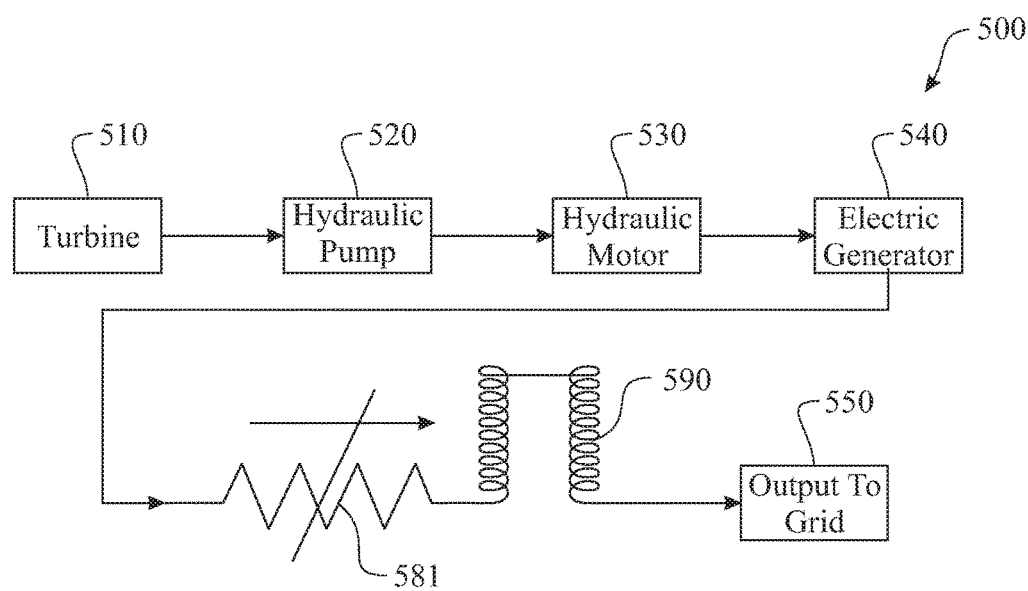
FIG. 23 presents an exemplary schematic diagram illustrating operational interactions between various components of the exemplary wind operated electrical power generating system introduced in FIG. 21.

The exemplary schematic diagram shown in FIG. 23 additionally illustrates the interaction between each of the primary components, as previously described herein.

Figure 24:
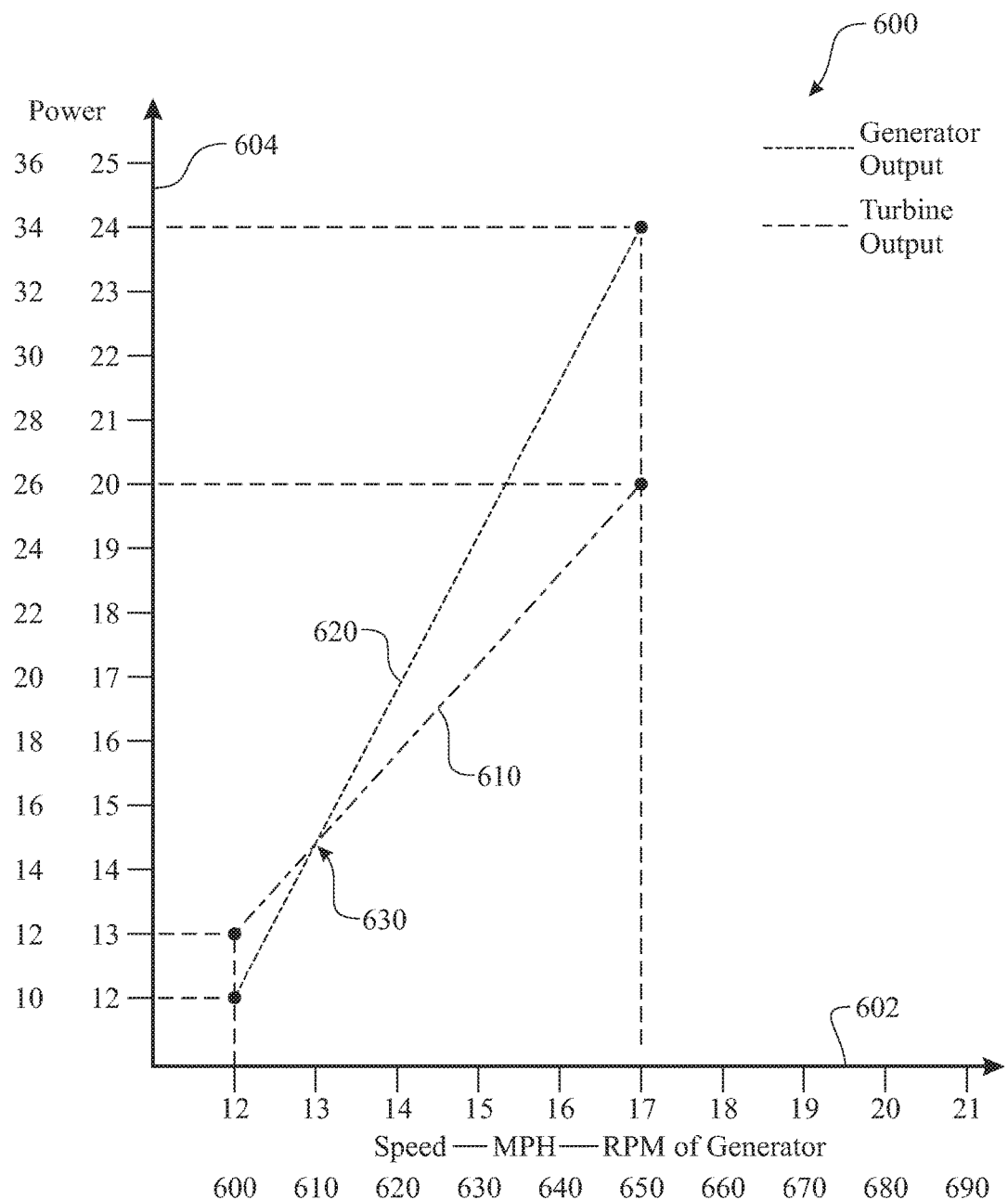
FIG. 24 presents an exemplary power output chart illustrating a power output to rotational speed relationship.

An exemplary power output chart 600 is presented in FIG. 24. The power output chart 600 plots a power output based upon a rotational speed of each of a generator (illustrated as a turbine theoretical output power curve 610) and a wind turbine (illustrated as a generator theoretical output power curve 620). The rotational speed of the associated element is referenced along a rotational speed axis 602. The output power of the associated element is referenced along a power output axis 604. The power output of the generator increases at a greater rate compared to the output of the turbine. The speed in which the generator theoretical output power curve 620 crosses over the turbine theoretical output power curve 610 defines a stall point 630. It is desired to optimize the electric power output by the generator, wherein the electric power output by the generator remains slightly below the power output by the turbine.

Figure 25:
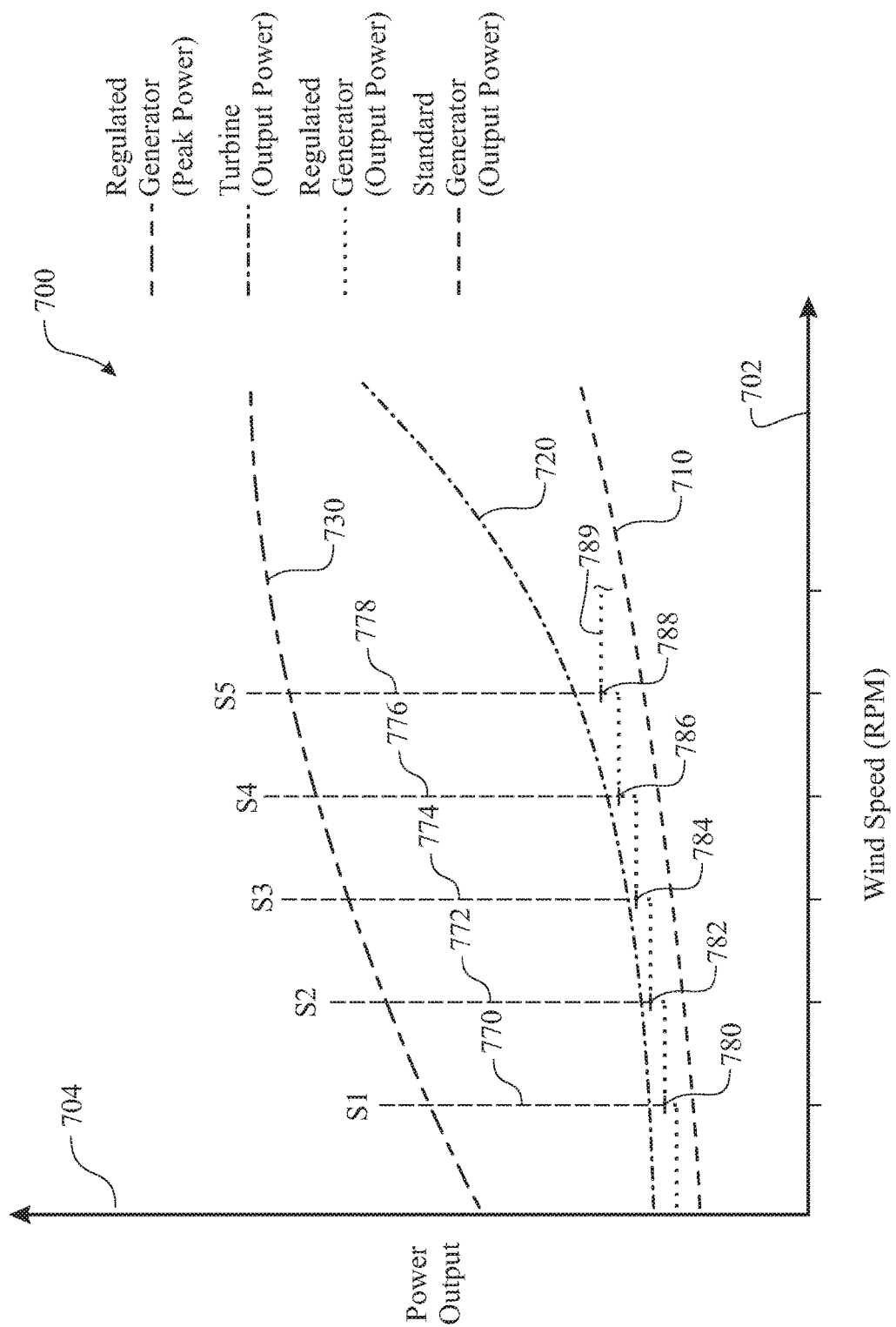
FIG. 25 presents an exemplary power output chart illustrating benefits of the power optimizing controller introduced in FIG. 21.

An exemplary power output chart 700 is presented in FIG. 25 by plotting a power output (that is associated with a wind speed. The wind or associated rotational speed is referenced along a wind speed generated RPM axis 702. The output power of the associated element is referenced along a power output axis 704.

The current technology employs a generator that has a lower output than the power captured by the wind operated turbine assembly 510. The infrastructure is configured in this manner to avoid overpowering the turbine, where a larger or excessive generator would overdrive the turbine. Alternatively stated, if the power extracted from the wind operated turbine assembly 510 is greater than the 100% of the power allowed by the wind operated turbine assembly 510, the wind operated turbine assembly 510 stalls. Therefore, it had been established that the generators should remain below the stall point of the associated turbine 510. This principle was understood to be a fundamental requirement, thus limiting the power output to the maximum capabilities of the currently utilized generators. An exemplary input, or power captured by the wind operated turbine assembly 510, is represented by a turbine power curve 720. The associated power output using currently deployed generators is represented by a current generator curve 710. The vertical gap between the turbine power curve 720 and the current generator curve 710 depicts losses.

Conversely, implementation of a larger generator in conjunction with the power control module 560 enables optimization of the power output while avoiding overpowering or governing the wind operated turbine assembly 510. The associated power output using a regulated generator is represented by a regulated generator curve 730, wherein the regulated generator creates excessive power or power greater than the power obtained by the turbine 510. Power optimization is accomplished by introducing a variable resistance into the electric network. The process is further optimized by monitoring for predetermined rotational speeds 770, 772, 774, 777, 778 of the electric generator 540 (or calibrated to determine an associated rotational speed) and adjusting the resistance accordingly by adjusting an associated potentiometer 580, 582, 584, 586, 588. The goal is to maintain or govern a power output, identified as an adjusted power output 780, 782, 784, 786, 788 at a level slightly less than the power obtained by the wind operated turbine assembly 510. The power output chart 700 illustrates the small gap between each adjusted power output point 780, 782, 784, 786, 788 and the associated curve of the turbine power curve 720. The power output remains constant, independent of the speed of rotation of the turbine blade assembly 514, as illustrated by the regulated power output curve 789. The resulting regulated power output curve 789 has a step curve shape. The exemplary power output chart 700 illustrates the additional electric power output at each respective rotational speed 770, 772, 774, 777, 778 compared to the power output from the standard generator 710. The gap parallel to the power output axis 704 between each adjusted power output level 780, 782, 784, 786, 788 and the associated power output level of the standard generator 710 defines the increase in power output, based upon the same energy created by the wind operated turbine assembly 510. Those skilled in the art would understand that the number of predetermined rotational speeds 770, 772, 774, 777, 778 and the number of associated potentiometer 580, 582, 584, 586, 588 can vary based upon the characteristics and engineering of the system.

In operation, as the rotational speed approaches each predetermined rotational speed, the respective rotational speed indicator 570, 572, 574, 576, 578 converts to a notification state. The service person adjusts the associated potentiometer 580, 582, 584, 586, 588 to optimize the power output to the desired level of slightly lower than the turbine power curve 720. The increased load acts as a brake and decreases the rotational speed of the turbine blade subassembly 514. By varying the electric load, the rotational speed of the turbine blade subassembly 514 changes to optimize the power generated across many different bands of rotational speeds.

Although the exemplary embodiment integrates a controller 560 into a system employing a hydraulically driven system, it is understood that the power control module 560 can be integrated into any system employing a wind driven turbine used to power an electric generator.

Although the exemplary embodiments are directed towards a wind powered system, it is understood that the same power optimization system can be applied to a water driven turbine system.

Figure 26:
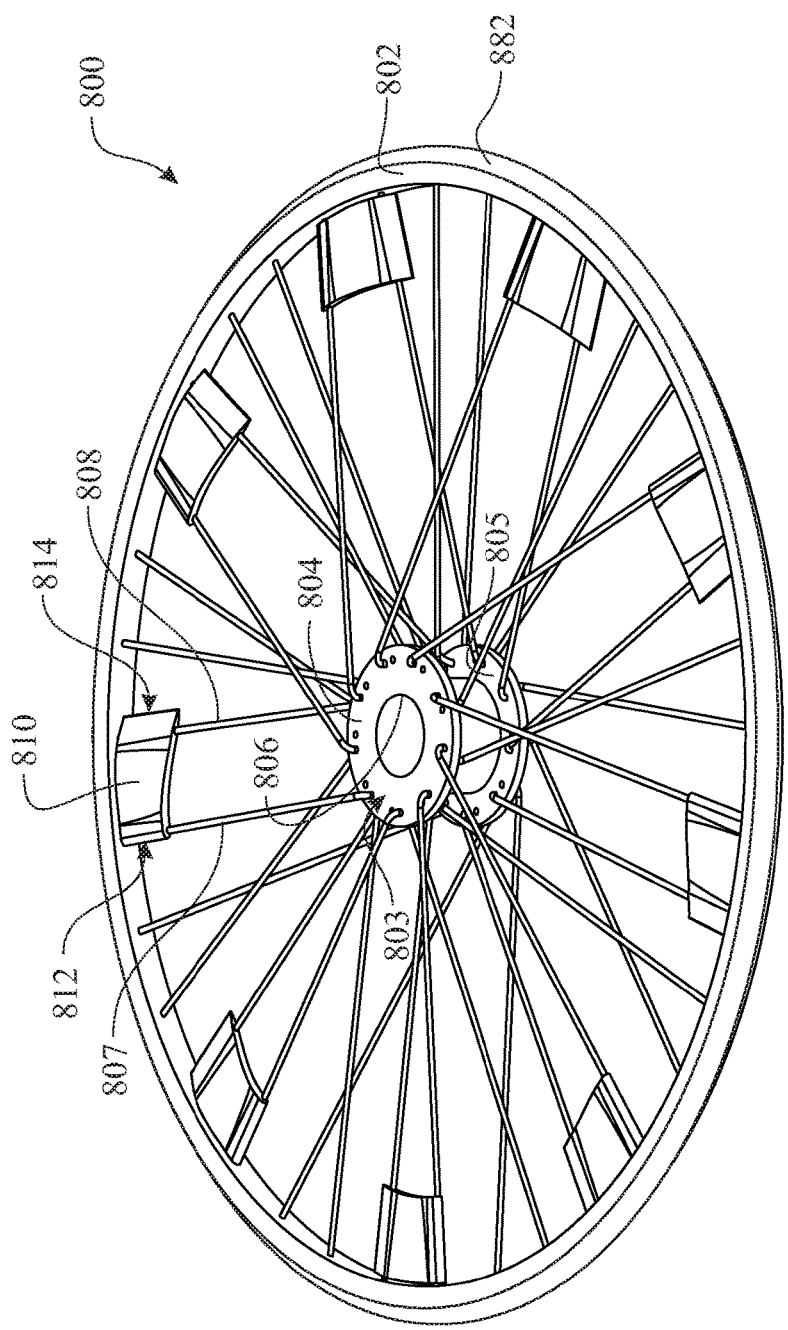
FIG. 26 presents an isometric view of an exemplary tension lifting wing wheel assembly.
Figure 27:
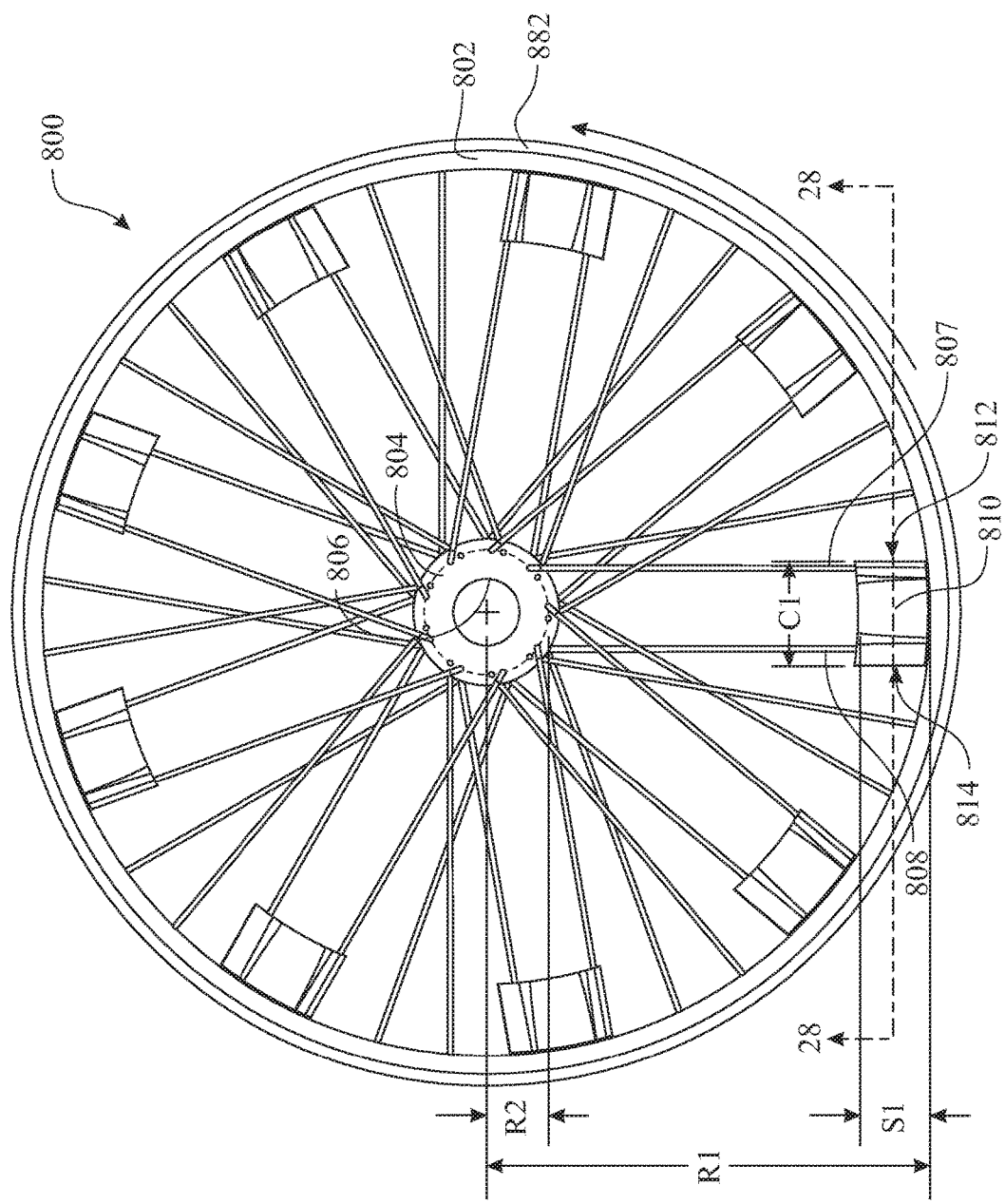
FIG. 27 presents a front view of the exemplary tension lifting wing wheel assembly originally introduced in FIG. 26.
Figure 28:
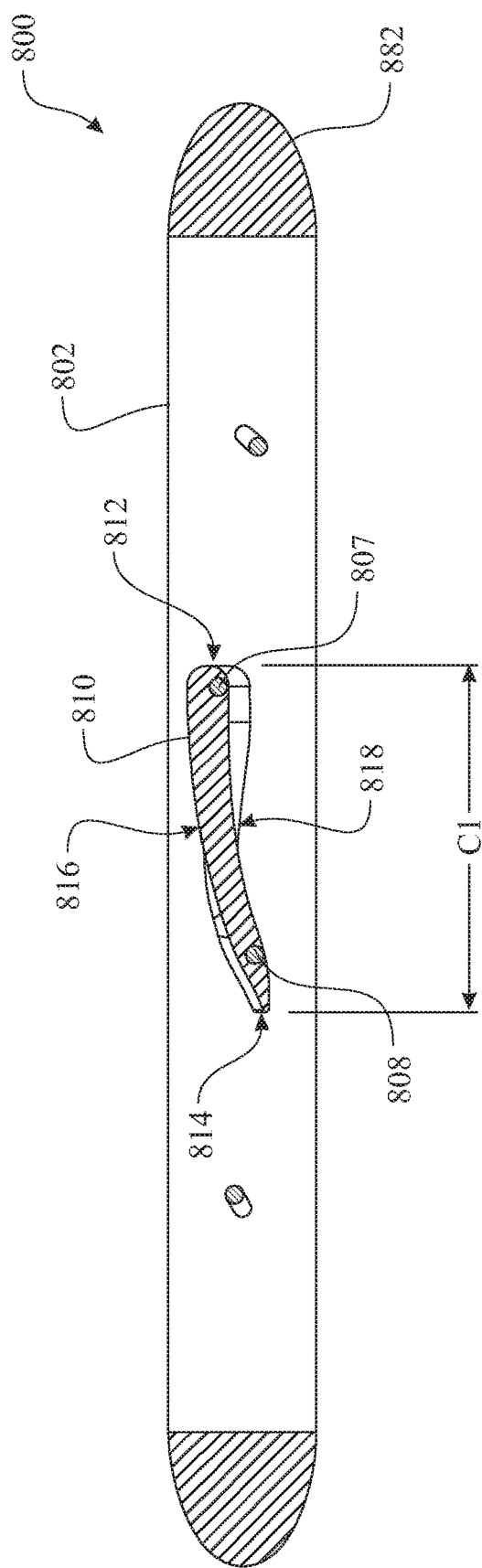
FIG. 28 presents a cross section view of the exemplary tension lifting wing wheel assembly originally introduced in FIG. 26, the section being taken along section line 28-28 of FIG. 27.

The turbine wheel assembly 100 can be modified and adapted for other applications. A tension lifting wing wheel assembly 800, illustrated in FIGS. 26 through 28, is an adaptation designed to provide lift. The tension lifting wing wheel assembly 800 and the turbine wheel assembly 100 comprise a number of like features. Like features of the tension lifting wing wheel assembly 800 and the turbine wheel assembly 100 are numbered the same except preceded by the numeral '8'. The tension lifting wing wheel assembly 800 is an assembly defining a wing comprising a plurality of winglets 810. The tension lifting wing wheel assembly 800 is an assembly comprising a tension lifting wing outer rim 802 assembled to a tension lifting wing central hub assembly 803 by a series of spokes 807, 808. The tension lifting wing central hub assembly 803 includes a tension lifting wing first center hub flange 804 and a tension lifting wing second center hub flange 805 extending radially outward from opposite ends of an axle bearing 806. The outer edge of the tension lifting wing outer rim 802 is preferably shaped having a tension lifting wing outer rim aerodynamic surface 882, as illustrated. The tension lifting wing outer rim 802 is designed having an internal radius R1. The center hub flanges 804, 805 are designed having an external radius R2. The hub external radius is defined as a distance between the rotational axis of the hub and a ring defined by the centers of the spoke hub attachment holes or other spoke attachment features. A different between the radii D2 and D1 (D2−D1) defines an effective length of each spoke 807, 808. The optimal design would include a R1 to R2 ratio of 6:1. The optimal ratio provides a configuration where the tension lifting wing leading spoke 807 and the tension lifting wing trailing spoke 808 are substantially parallel with one another and run parallel to a radial axis extending outward from a central point of the axle bearing 806. Although the optimal ration is 6:1, it is recognized that the ratio can vary between 4:1 and 8:1, or even broader of 3:1 to 10:1.

It is preferred that the winglet 810 be assembled to the tension wing lifting assembly 800 having an outer edge being located proximate an inner surface of the tension lifting wing outer rim 802. Dimensions of the winglet 810 are defined by a wing span S1 and a wing cord C1. The wing span S1 refers to a distance between the outer edge and an inner edge of the winglet 810. The wing cord C1 refers to a distance between the leading edge 812 and the trailing edge 814 of the winglet 810. The wing span S1 is preferably equal to or less than fifty percent (50%) of the effective length of each spoke 807, 808. The wing span S1 is more preferably equal to or less than thirty three percent (33%) of the effective length of each spoke 807, 808. The wing span S1 is even more preferably equal to or less than thirty percent (30%) of the effective length of each spoke 807, 808. The wing span S1 is even more preferably equal to or less than twenty-five percent (25%) of the effective length of each spoke 807, 808.

Other design features of the tension lifting wing wheel assembly 800 include:
  a. Each spoke 807, 808 can cross other spokes defining three crossover locations.
  b. The spokes 807, 808 can include a circular cross section shape, an aerodynamic cross section shape, or any other suitable cross section shape.
  c. Spokes can be arranged to alternate between extending from an outer surface of each hub flange 804, 805 and from an inner surface of the same hub flange 804, 805.
  d. It is preferred that the tension lifting wing wheel assembly 800 includes a total of 36 spokes, 18 per hub flange 804, 805.
  e. Each spoke 807, 808 would preferably be assembled having substantially equally tension.
  f. The spoke hub attachment holes can be even spaced about the hub flange 804, 805. Alternatively, the spoke hub attachment holes can be arranged in pairs, wherein the pairs are arranged having a first spacing and each adjacent pair is arranged having a second spacing about the hub flange 804, 805, wherein the first spacing and the second spacing differ from one another.
  g. The series of spoke hub attachment holes of the tension lifting wing first center hub flange 804 and the series of spoke hub attachment holes of the tension lifting wing second center hub flange 805 are offset from one another.
  h. The axial height of the tension lifting wing outer rim 802 is determined by maximizing the desired strength of the tension lifting wing outer rim 802, while providing sufficient area to support a connection of each spoke 807, 808.

i. The attachment locations of each spoke 807, 808 along an interior surface of the tension lifting wing outer rim 802 are either linear with one another or located in an alternating configuration.

j. The tension lifting wing central hub assembly 803 is preferably substantially centered axially respective to the tension lifting wing outer rim 802. Alternatively, the tension lifting wing central hub assembly 803 can be offset axially respective to the tension lifting wing outer rim 802.

The tension lifting wing wheel assembly 800 includes a series of wings 810. Each winglet 810 has an airfoil or lifting shape, where a length of a winglet upper surface 816, extending from a winglet leading edge 812 to a winglet trailing edge 814, is longer than a length of a winglet lower surface 818, extending from the winglet leading edge 812 to the winglet trailing edge 814. The winglet upper surface 816 is a preferably a convex surface. The winglet lower surface 818 is preferably a planar or a concave surface. The winglet 810 can be a solid assembly or hollowed to reduce weight. The winglet 810 can be of any suitable shape. The exemplary winglet 810 is rectangular or square in shape. The winglet leading edge 812 preferably is formed having a rounded edge. The winglet trailing edge 814 preferably is formed having a tapering edge. Each winglet 810 is preferably located proximate the outer region of the tension lifting wing wheel assembly 800, or proximate the interior surface of the tension lifting wing outer rim 802.

In one configuration, the winglet 810 would be sized to extend along approximately thirty percent (30%) of the outermost or distal portion of the spoke 807, 808. In an alternate configuration, the winglet 810 would be sized to extend along between twenty percent (20%) and forty percent (40%) of the outermost or distal portion of the spoke 807, 808. In another alternate configuration, the winglet 810 would be sized to extend along between ten percent (10%) and fifty percent (50%) of the outermost or distal portion of the spoke 807, 808. The outermost portion of the tension lifting wing wheel assembly 800 travels at the greatest linear velocity. Lift is a function of velocity.

Each winglet 810 is assembled to a pair of spokes 807, 808 using any suitable mechanical assembly configuration. In the exemplary embodiment, the winglet 810 is assembled to the pair of spokes 807, 808 by inserting each spoke through a respective bore formed through the winglet 810. The wings 810 are spatially arranged about the tension lifting wing wheel assembly 800. A space or gap is provided between the winglet trailing edge 814 of a forward located winglet 810 and a winglet leading edge 812 of a trailing located winglet 810. The winglet 810 can be formed having a slight twist, as illustrated, to accommodate the respective angles of the respective spokes 807, 808. Alternatively, the winglet 810 can have a greater thickness. The twisted blade shape of the winglet 810 produces more power or lift compared to straight wings. This is because as the winglet 810 gets closer to the hub 803, the wind speed becomes less, requiring more a greater angle of attack to produce lift.

Figure 29:
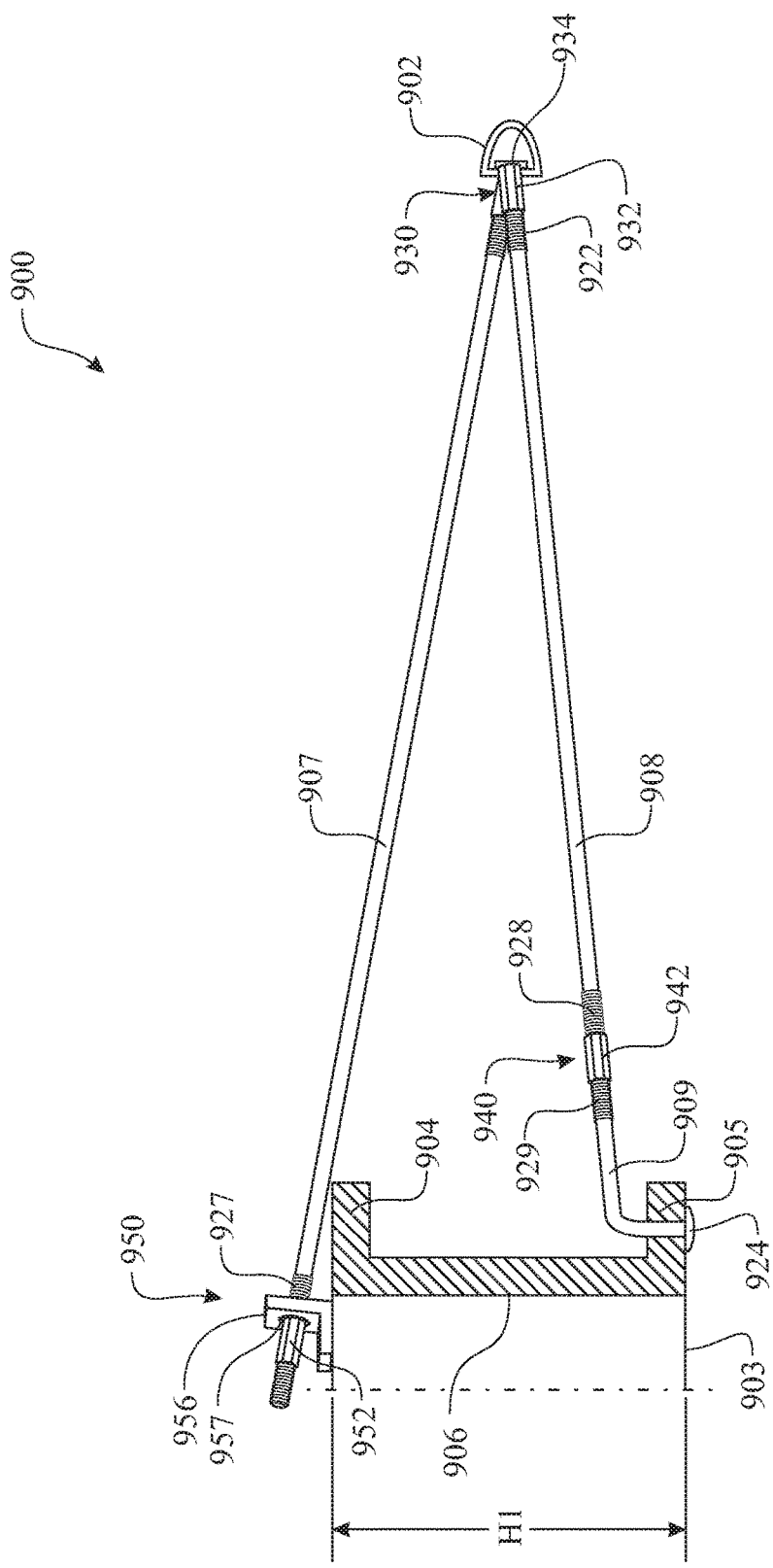
FIG. 29 presents a cross section view of an enhanced exemplary tension lifting wing wheel assembly introducing several optional tension adjusting configurations.

The angle of attack can be established by the arrangement of the spokes 807, 808, the height H1 (identified in FIG. 29) of the tension lifting wing central hub assembly 803, or the like, or any combination thereof. The greater the height of hub H1 or the span between the hub flanges 804, 805, the greater the angle of attack.

The tension lifting wing wheel assembly 800 is designed to be implemented to provide lift. The tension lifting wing wheel assembly 800 includes features to drive a rotational motion. For example, the axle bearing 806 can include one or more features which would engage with a rotating shaft of a drive system, such as a motor. In another example, one or both hub flanges 804, 805 can be fixed to the rotating shaft of a drive system. In yet another example, the tension lifting wing central hub assembly 803 can include a unidirectional drive mechanism, wherein the drive system drives a rotation in a lifting direction, but when necessary, the tension lifting wing wheel assembly 800 can rotate freely in a reverse direction.

It is understood that the tension lifting wing wheel assembly 800 would be rotationally balanced. Rotational balancing can be accomplished by any known method of balancing a rotating assembly, including by design, balancing of components, balancing of the assembly, and the like, or any combination thereof.

The spokes are assembled having a tension. The tension can be created by any suitable tension generating system or any combination of suitable tension generating systems. Examples of various suitable tension generating systems, including a spoke distal assembly tensioning nipple 930, a spoke distal assembly central tensioning system 940, and a hub located spoke tensioning system 950, are illustrated being employed on a tension lifting wing wheel assembly 900, as presented in FIG. 31. Like features of the tension lifting wing wheel assembly 900 and the tension lifting wing wheel assembly 800 are numbered the same except preceded by the numeral '9'. One or more of the spoke distal assembly tensioning nipple 930, the spoke distal assembly central tensioning system 940, and the hub located spoke tensioning system 950 would be integrated into the tension lifting wing wheel assembly 800, providing to and retaining tension in the spokes 807, 808.

The spoke distal assembly tensioning nipple 930 includes a spoke distal assembly tensioning nipple body 934 formed at a distal end of a spoke distal assembly tensioning nipple flange 932. The spoke distal assembly tensioning nipple body 934 is sized and shaped to adequately support tension applied to the spoke 907, 908 against a mating surface of the tension lifting wing outer rim 902. The spoke distal assembly tensioning nipple body 934 can be of a fixed size and shape or capable of changing shape after being inserted through a respective receiving aperture formed through the tension lifting wing outer rim 902. For example, the spoke distal assembly tensioning nipple body 934 can be shaped and function similar to a wall molly, a rivet, or the like. A spoke distal threading 922 is formed at a distal end of each spoke 907, 908. Threading (not shown, but well understood) is formed within an interior cylindrical surface of a cavity of each spoke distal assembly tensioning nipple flange 932, wherein the threading has the same thread size and pitch to mate with the spoke distal threading 922.

In the exemplary tension lifting wing wheel assembly 900, the tension lifting wing trailing spoke 808 is represented by a spoke segmented into a tension lifting wing trailing spoke distal segment 908 and a tension lifting wing trailing spoke proximal segment 909; the segments 908, 909 being assembled by the spoke distal assembly central tensioning system 940. A spoke distal segment proximal threading 928 is formed at a proximal end of the tension lifting wing trailing spoke distal segment 908. A spoke proximal segment distal threading 929 is formed at a distal end of the tension lifting wing trailing spoke proximal segment 909. The spoke distal segment proximal threading 928 and the spoke proximal segment distal threading 929 would have counter rotating threading, wherein a rotational direction the spoke distal segment proximal threading 928 is formed having a first rotational direction and the rotational direction of the spoke proximal segment distal threading 929 is formed having an opposite rotational direction. A spoke distal assembly central tensioning element 942 of the spoke distal assembly central tensioning system 940 would include a central bore having threaded ends. The threaded ends would also include counter rotating threading to mate with the spoke threading 928, 929. Tension can be adjusted by rotating the spoke distal assembly central tensioning element 942 in a first rotational direction to increase tension or rotating the spoke distal assembly central tensioning element 942 in a second rotational direction to decrease tension.

A proximal or hub end of each spoke, such as the exemplary tension lifting wing trailing spoke proximal segment 909 can be bent and formed creating a spoke anchor flange 924. The spoke anchor flange 924 engages with a mating surface of the hub flange 904, 905 to adequately support the tension generated along the spoke 908, 909. The bend in the tension lifting wing trailing spoke proximal segment 909, when inserted through the spoke hub attachment hole, also refrains the tension lifting wing trailing spoke proximal segment 909 from rotating.

The hub located spoke tensioning system 950 employs an alternative assembly configuration compared to the bend and formation of the spoke anchor flange 924 of the tension lifting wing trailing spoke proximal segment 909. The hub located spoke tensioning system 950 includes a spoke proximal threading 927 formed at a proximal or hub end of the tension lifting wing leading spoke 907. A hub located spoke tensioning bracket 956 would be integrally formed with or assembled to the tension lifting wing first center hub flange 904. The tension lifting wing leading spoke 907 would be inserted through an aperture formed through the hub located spoke tensioning bracket 956. A hub located spoke tensioning element 952 would be threadably secured to the proximal end of the spoke proximal threading 927 on a hub side of the hub located spoke tensioning bracket 956 and adjusted to generate and retain a tension along the tension lifting wing leading spoke 907. An optional tensioning bracket cavity 957 can be formed within the hub located spoke tensioning bracket 956 to seat the hub located spoke tensioning element 952 accordingly.

It is understood that the spoke distal assembly tensioning nipple 930, the spoke distal assembly central tensioning system 940, and the hub located spoke tensioning system 950 can be used individually, or in any suitable combination thereof. The spoke distal assembly tensioning nipple 930, the spoke distal assembly central tensioning system 940, and the hub located spoke tensioning system 950 are only exemplary and any suitable tension generating system or systems can be integrated into the tension lifting wing wheel assembly 800, 900.

The spoke assembly configuration can be adapted to include a spoke breakaway feature 1050. An exemplary spoke breakaway feature 1050 is introduced in FIGS. 30 and 31. The spoke tensioning breakaway assembly 1050 is integrated into a tension lifting wing wheel assembly 1000, wherein the tension lifting wing wheel assembly 1000 is a modified variant of the tension wing lifting assembly 800 and/or tension lifting wing wheel assembly 900. Like elements of the tension lifting wing wheel assembly 1000 and the tension lifting wing wheel assembly 900 are numbered the same, except preceded by a numeral "10". The exemplary illustration integrates the spoke tensioning breakaway assembly 1050 at an end of each spoke 1007, 1008 located proximate a tension lifting wing outer rim 1002. It is understood that the spoke tensioning breakaway assembly 1050 can be integrated at a location proximate the tension lifting wing outer rim 1002 or the hub (not shown). In another alternative configuration, the spoke tensioning breakaway assembly 1050 can be integrated at any position along a length of the spoke.

The concept behind operation of the spoke tensioning breakaway assembly 1050 is that while a tension is applied along a length of the spoke 1007, 1008, at least one tensioning assembly coupling element 1070 retains a coupling between a tensioning nipple assembly 1030 and a tensioning stud 1060. In a preferred configuration, the spoke tensioning breakaway assembly 1050 employs at least two tensioning assembly coupling elements 1070.

The tensioning nipple assembly 1030 includes a spoke tensioning nipple flange 1034 extending radially outward from a distal end of a spoke tensioning nipple body 1032, as shown, or from a distal end of a segment of the respective spoke. The spoke tensioning nipple body 1032 can include a threaded surface to matingly engage with a mating threaded portion 1022 of the spoke 1008, as illustrated. In the exemplary embodiment, the spoke tensioning nipple body 1032 includes a female threaded bore and the spoke distal threading 1022 is formed having male threading. It is understood that the spoke tensioning nipple body 1032 can comprise male threading and the spoke distal threading 1022 can be formed as female threading. Inclusion of threaded mating surfaces enables the tensioning nipple assembly 1030 to be used to generate tension along the spoke 1008. It is understood that alternate configurations, such as those included in the tension lifting wing wheel assembly 900 can be employed to create and maintain tension within the spoke 1008.

The tensioning stud 1060 includes a tensioning stud flange 1064 extending radially outward from a distal end of a tensioning stud trunk 1062. The tensioning stud trunk 1062 can be attached to a tension lifting wing rim inner surface 1084 of the tension lifting wing outer rim 1002, an end of a segment of the spoke 1007, 1008, a flange of the hub (not shown), or any other suitable element of the tension lifting wing wheel assembly 1000. The tensioning stud 1060 can be mechanically assembled to the respective element of the tension lifting wing wheel assembly 1000 using a permanent assembly method or a temporary mechanical interface. The tensioning stud 1060 can be welded to the respective element of the tension lifting wing wheel assembly 1000, bolted to the respective element of the tension lifting wing wheel assembly 1000, or any other permanent assembly method. Alternatively, the tensioning stud 1060 can include a suitable flange, wherein the flange would be larger than a respective aperture formed through the respective element of the tension lifting wing wheel assembly 1000, or any other temporarily assembly configuration. In another alternate configuration, the tensioning stud 1060 can be integrally formed with the respective element of the tension lifting wing wheel assembly 1000, such as by machining, casting, and the like. In yet another configuration, the tensioning stud 1060 can be integrated into an end of a segment of the spoke 1007, 1008 using any suitable manufacturing process.

Figure 30:
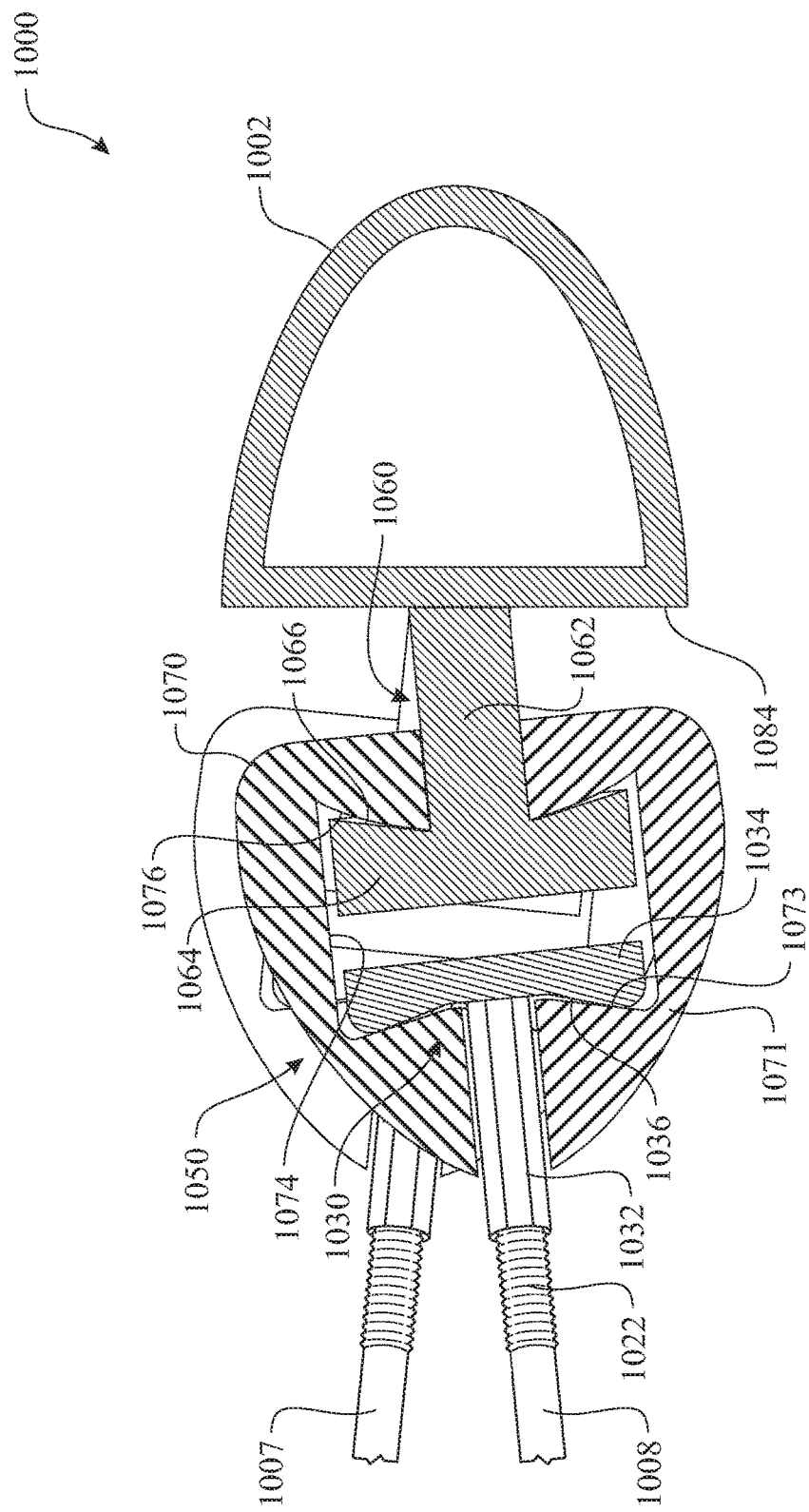
FIG. 30 presents a cross section view of an enhanced exemplary tension lifting wing wheel assembly introducing a spoke breakaway feature, wherein the spoke breakaway feature is shown in an assembled state, retained by tension within the spoke.
Figure 31:
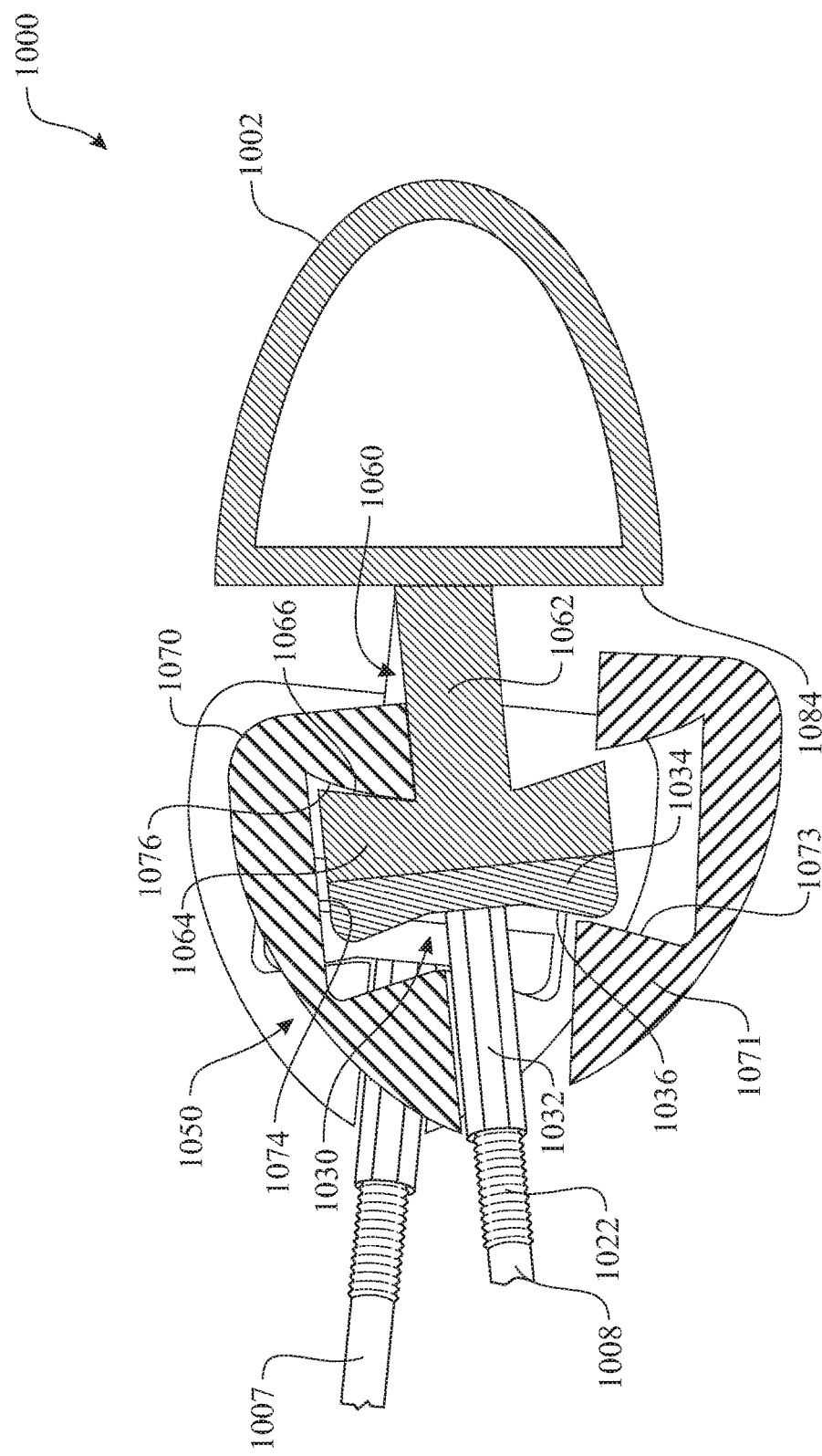
FIG. 31 presents a cross section view of the enhanced exemplary tension lifting wing wheel assembly previously illustrated in FIG. 30, wherein the spoke breakaway feature is shown in a partially separated state, initiated by a broken spoke.

A tensioning assembly coupling element connection cavity 1074 is formed within the tensioning assembly coupling element 1070. The tensioning assembly coupling element connection cavity 1074 is sized and shaped to enclose each of the spoke tensioning nipple flange 1034 and the tensioning stud flange 1064, as illustrated in FIG. 30. Additionally, the tensioning assembly coupling element connection cavity 1074 is sized to enable the spoke tensioning nipple flange 1034 and the tensioning stud flange 1064 to become dislodged from within the tensioning assembly coupling element connection cavity 1074, freeing a broken spoke 1007, 1008 from the tension lifting wing wheel assembly 1000, as illustrated in FIG. 31. Details of the operation of the spoke tensioning breakaway assembly 1050 are described later within this disclosure.

A tensioning stud flange assembly retention surface 1066 is formed within the tensioning stud flange 1064. The tensioning stud flange assembly retention surface 1066 is formed having a debossed or inwardly extending shape. The debossed surface can be of any suitable shape, including a concave surface, as illustrated, a conically shaped surface, a "V" shaped surface, and the like. A tensioning coupling element stud flange retention surface 1076 is formed within the tensioning assembly coupling element 1070. The tensioning coupling element stud flange retention surface 1076 is shaped to matingly engage with the tensioning stud flange assembly retention surface 1066. The tensioning coupling element stud flange retention surface 1076 of the tensioning assembly coupling element 1070 would have a shape that mirrors that of the tensioning stud flange assembly retention surface 1066. More specifically, the tensioning coupling element stud flange retention surface 1076 would have a bossed or outwardly extending surface. The shape of the tensioning coupling element stud flange retention surface 1076 is preferably exaggerated compared to the shape of the surface of the tensioning stud flange assembly retention surface 1066, as illustrated. This differential in shapes of the mating surfaces focusing the contacting surfaces towards the centers accordingly.

Similarly, a spoke tensioning nipple spoke assembly retention surface 1036 is formed within the spoke tensioning nipple flange 1034. The spoke tensioning nipple spoke assembly retention surface 1036 is formed having a debossed or inwardly extending shape. The debossed surface can be of any suitable shape, including a concave surface, as illustrated, a conically shaped surface, a "V" shaped surface, and the like. A tensioning coupling element nipple flange retention surface 1073 is formed within the tensioning assembly coupling element 1070. The tensioning coupling element nipple flange retention surface 1073 is shaped to matingly engage with the spoke tensioning nipple spoke assembly retention surface 1036. The tensioning coupling element nipple flange retention surface 1073 would have a shape that mirrors that of the spoke tensioning nipple spoke assembly retention surface 1036. More specifically, the tensioning coupling element nipple flange retention surface 1073 would have a bossed or outwardly extending surface. The shape of the tensioning coupling element nipple flange retention surface 1073 is preferably exaggerated compared to the shape of the surface of the spoke tensioning nipple spoke assembly retention surface 1036, as illustrated. This differential in shapes of the mating surfaces focusing the contacting surfaces towards the centers accordingly.

As a tension is applied to the respective spoke 1008, the tension separates the spoke tensioning nipple flange 1034 and the tensioning stud flange 1064 from one another. During the separation between the spoke tensioning nipple flange 1034 and the tensioning stud flange 1064, the spoke tensioning nipple spoke assembly retention surface 1036 engages with the tensioning coupling element nipple flange retention surface 1073, pulling the tensioning assembly coupling element 1070, causing the tensioning coupling element stud flange retention surface 1076 to engage with the tensioning stud flange assembly retention surface 1066. The shape of the tensioning stud flange assembly retention surface 1066 and the tensioning coupling element stud flange retention surface 1076 draws the tensioning assembly coupling element 1070 to center along the tensioning stud trunk 1062. Similarly, the shape of the spoke tensioning nipple spoke assembly retention surface 1036 and the tensioning coupling element nipple flange retention surface 1073 draws the tensioning assembly coupling element 1070 to center along the spoke tensioning nipple body 1032. It is preferred to employ a pair of tensioning assembly coupling elements 1070 (identified as a 1070 and a 1071), thus balancing the spoke tensioning breakaway assembly 1050. The pair of tensioning assembly coupling elements 1070 can be independent of one another or hingeably coupled to one another.

When a spoke 1008 breaks, as illustrated in FIG. 31, the centrifugal force draws the spoke tensioning nipple flange 1034 towards the tensioning stud flange 1064. This enables the tensioning assembly coupling element 1070 to separate from the tensioning nipple assembly 1030 and the tensioning stud 1060. The tensioning assembly coupling element connection cavity 1074 is shaped and sized to allow each tensioning assembly coupling element 1070 to separate from the tensioning nipple assembly 1030 and the tensioning stud 1060. Once separated, the associated section of the spoke 1008 becomes free from the tension lifting wing wheel assembly 1000. The exemplary configuration locates the spoke tensioning breakaway assembly 1050 proximate or integral with the tension lifting wing outer rim 1002. A second spoke tensioning breakaway assembly 1050 can be integral with the hub. The inclusion of the pair of spoke tensioning breakaway assemblies 1050 enables complete release of an entire broken spoke 1008.

Although the exemplary illustrations present one configuration of the 1050, it is understood that any broken spoke ejection system can be employed by the tension lifting wing wheel assembly 1000.

Figure 32:
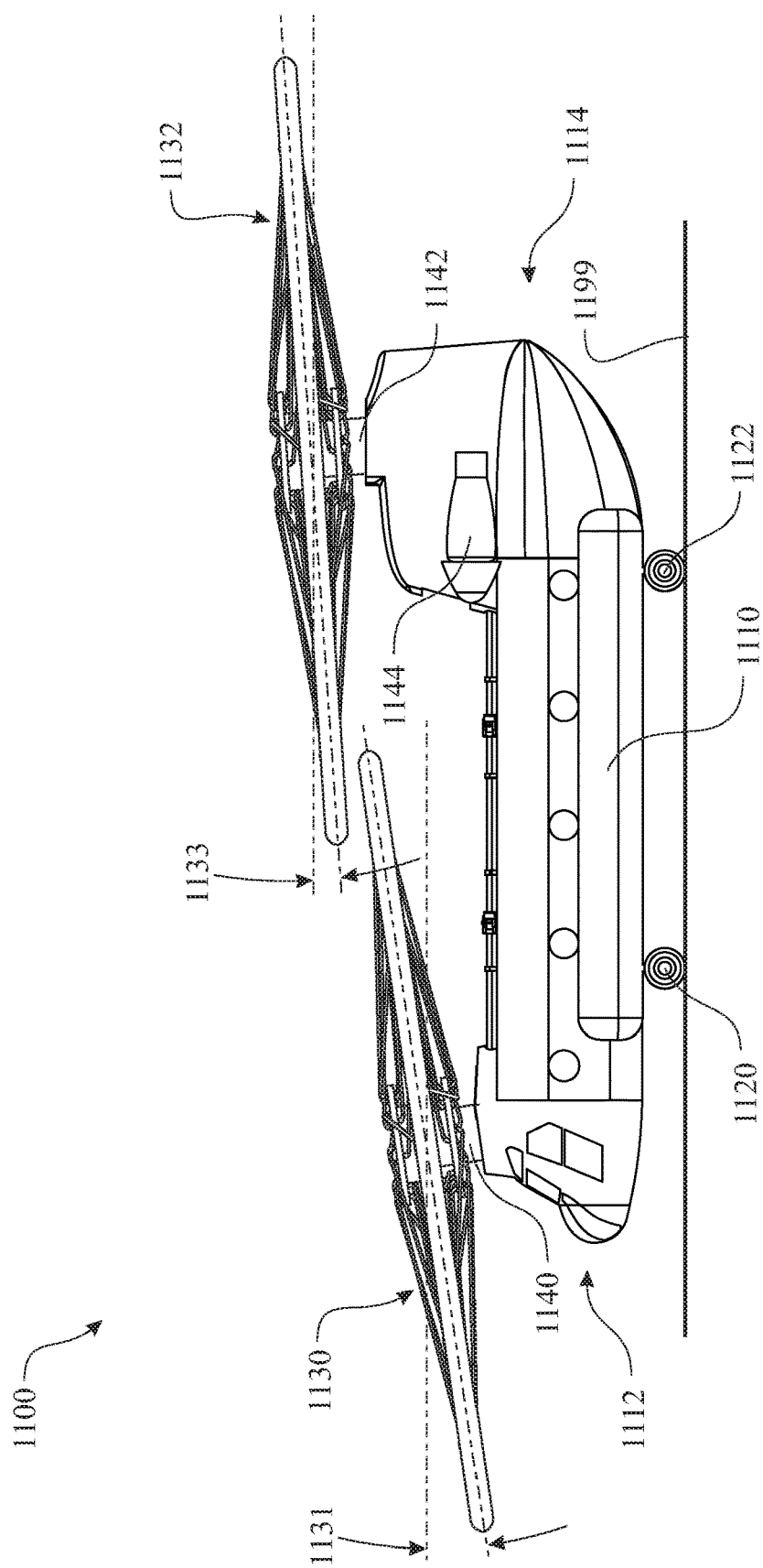
FIG. 32 presents a side view of an exemplary tandem rotor heavy-lift helicopter employing the tension lifting wing wheel assembly.
Figure 33:
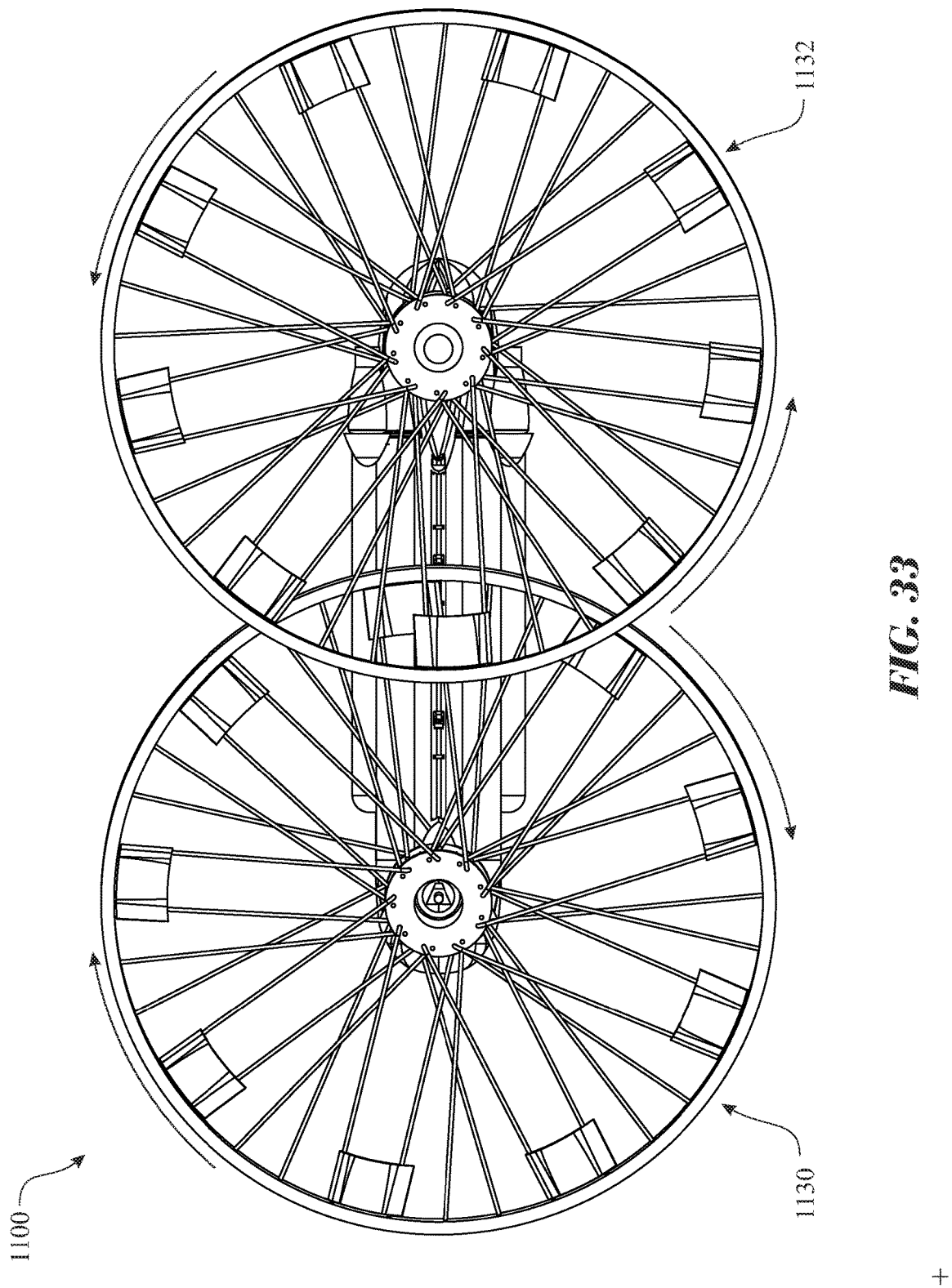
FIG. 33 presents a top view of the exemplary tandem rotor heavy-lift helicopter originally introduced in FIG. 32.

The tension lifting wing wheel assembly 800 is designed to provide lift for heavy loads. In one application, a tandem rotor heavy-lift helicopter 1100 employs a pair of tension lifting wing wheel assemblies 800 (identified as a tandem rotor heavy-lift helicopter forward rotor assembly 1130 and a tandem rotor heavy-lift helicopter rearward rotor assembly 1132), as illustrated in FIGS. 32 and 33, to provide vertical lift. The tandem rotor heavy-lift helicopter 1100 includes a tandem rotor heavy-lift helicopter fuselage 1110, which provides structural support of the various flight and other operational components as well as storage for passengers and cargo. The orientation of the tandem rotor heavy-lift helicopter 1100 can be references by a tandem rotor heavy-lift helicopter front end 1112 and a tandem rotor heavy-lift helicopter rear end 1114. The tandem rotor heavy-lift helicopter rotor assemblies 1130, 1132 are operated by a rotor drive machine 1140, 1142. The rotor drive machines 1140, 1142 rotate each of the tandem rotor heavy-lift helicopter rotor assemblies 1130, 1132 in opposite or counter rotating directions. In the illustrated example, the tandem rotor heavy-lift helicopter forward rotor assembly 1130 rotates in a clockwise direction and the tandem rotor heavy-lift helicopter rearward rotor assembly 1132 rotates in a counter-clockwise direction, as illustrated in FIG. 33. Each tandem rotor heavy-lift helicopter rotor assembly 1130, 1132 would be arranged having an angle 1131, 1133 that is slight forward from horizontal (horizontal can be reference by a landing surface 1199). As illustrated in FIG. 32, the tandem rotor heavy-lift helicopter forward rotor assembly angle 1131 is greater from horizontal compared to the tandem rotor heavy-lift helicopter rearward rotor assembly angle 1133. The tandem rotor heavy-lift helicopter forward rotor assembly 1130 and the tandem rotor heavy-lift helicopter rearward rotor assembly 1132 can include rims 802 having equally diameters, as illustrated, or rims 802 having different diameters. The tandem rotor heavy-lift helicopter forward rotor assembly 1130 and the tandem rotor heavy-lift helicopter rearward rotor assembly 1132 can be located where the tandem rotor heavy-lift helicopter forward rotor assembly 1130 and the tandem rotor heavy-lift helicopter rearward rotor assembly 1132 would overlap one another, as illustrated, or the tandem rotor heavy-lift helicopter forward rotor assembly 1130 and the tandem rotor heavy-lift helicopter rearward rotor assembly 1132 can be located having a gap therebetween.

The tandem rotor heavy-lift helicopter 1100 is designed for heavy lifting. The tandem rotor heavy-lift helicopter fuselage 1110 would include a structural frame suitable for supporting heavy loads.

Although the tandem rotor heavy-lift helicopter 1100 is illustrated having a pair of rotor assemblies 1130, 1132, it is understood that the helicopter 1100 can be configured having a single horizontally oriented rotor assembly 1130, 1132 and a second, vertically oriented rotor assembly 1130, 1132. It is understood that one of the horizontally oriented rotor assembly 1130, 1132 and the second, vertically oriented rotor assembly 1130, 1132 can be the tension lifting wing wheel assembly 800 and the second of the horizontally oriented rotor assembly 1130, 1132 and the second, vertically oriented rotor assembly 1130, 1132 can be a currently employed rotor configuration.

Other noted features of the tandem rotor heavy-lift helicopter 1100 include landing gear 1120, 1122 and a tandem rotor heavy-lift helicopter propulsion jet 1144. The landing gear 1120, 1122 can be fixed or retractable. The landing gear 1120, 1122 can be of any suitable format, including wheels (as shown), landing skids, floatation pontoons, and the like.

Figure 34:
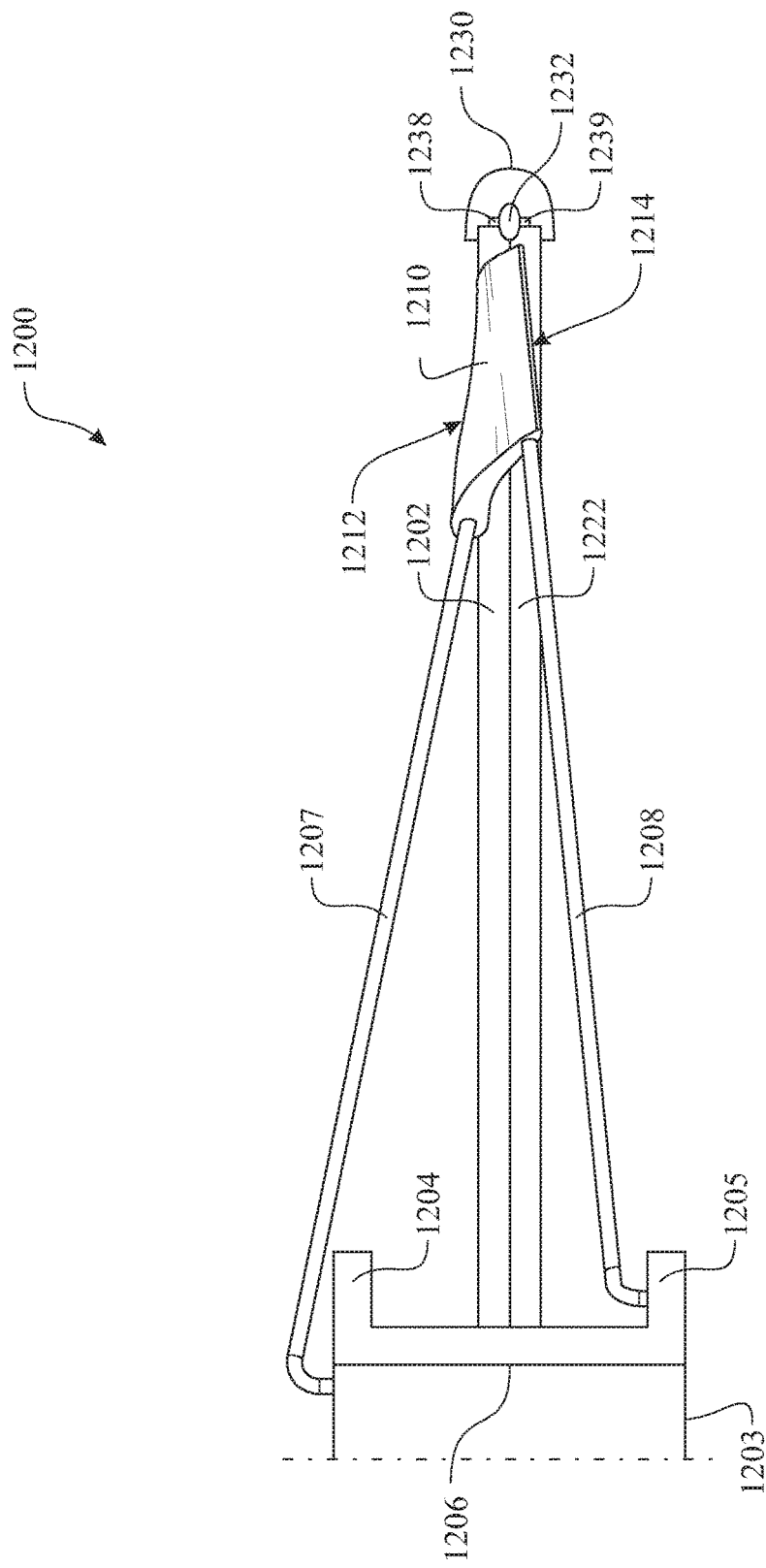
FIG. 34 presents a cross section view of an enhanced exemplary tension lifting wing wheel assembly introducing a wing angle of attack configuration, the illustration presenting a configuration having a low angle of attack.

The tension lifting wing wheel assembly 800 and the tension lifting wing wheel assembly 900 present configurations having fixed angles of attack. A lift angle adjusting tension lifting wing wheel assembly 1200, illustrated in FIGS. 34 and 35, introduces an enhanced version, wherein the lift angle adjusting tension lifting wing wheel assembly 1200 enables adjustability of the angle of attack of an angle adjusting winglet 1210. Like features of the lift angle adjusting tension lifting wing wheel assembly 1200 and the tension lifting wing wheel assembly 800 are numbered the same except preceded by the numeral '12'. The lift angle adjusting tension lifting wing wheel assembly 1200 introduces a pair of rims 1202, 1222. Distal ends of each tension lifting wing leading spoke 1207 are assembled to the tension lifting wing upper outer rim 1202 and distal ends of each tension lifting wing trailing spoke 1208 are assembled to the tension lifting wing first central hub assembly 1203. The axial spacing between tension lifting wing upper outer rim 1202 and the tension lifting wing first central hub assembly 1203 is controlled by engagement of a tension lifting wing angle adjusting cam 1232 against a upper outer rim axial adjusting controller feature 1238 of the tension lifting wing upper outer rim 1202 and a lower outer rim axial adjusting controller feature 1239 of the tension lifting wing first central hub assembly 1203. The tension lifting wing angle adjusting cam 1232 can be operated by any suitable rotating drive mechanism, which would preferably be located within a portion of a tension lifting wing peripheral rim 1230. The tension lifting wing peripheral rim 1230 would include features which retain the tension lifting wing upper outer rim 1202 and the tension lifting wing lower outer rim 1222 from extending beyond a predetermined separation distance. A plurality of separation mechanisms would be spaced around the tension lifting wing peripheral rim 1230 to ensure equal spacing during operation. In one application, the plurality of separation mechanisms would be substantially equally spaced around the tension lifting wing peripheral rim 1230 to ensure equal spacing during operation.

Figure 35:
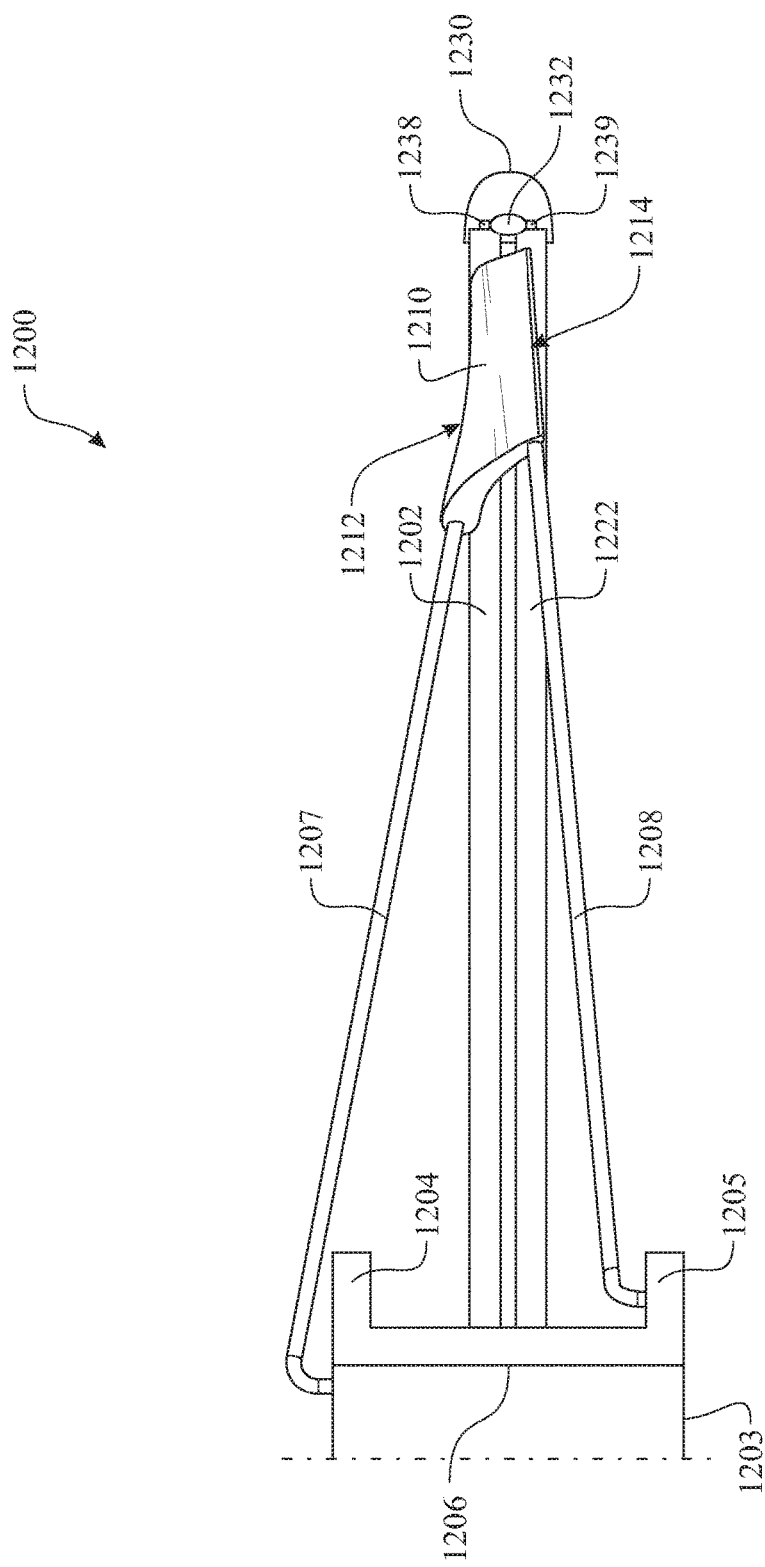
FIG. 35 presents a cross section view of the enhanced exemplary tension lifting wing wheel assembly originally introduced in FIG. 34, the illustration presenting a configuration having an increased angle of attack.

As the tension lifting wing angle adjusting cam 1232 is rotated, the tension lifting wing angle adjusting cam 1232 separates the upper outer rim axial adjusting controller feature 1238 and the lower outer rim axial adjusting controller feature 1239 from one another. The separation separates the tension lifting wing upper outer rim 1202 and the tension lifting wing lower outer rim 1222 from one another, as shown in FIG. 35. As the tension lifting wing upper outer rim 1202 and the tension lifting wing lower outer rim 1222 separate from one another, the distal distance between the tension lifting wing leading spoke 1207 and the tension lifting wing trailing spoke 1208 increases, causing the angle of attack of the angle adjusting winglet 1210 to increase. With the increase of the angle of attack of the angle adjusting winglet 1210, the lift increases at a lower rate of rotation of the lift angle adjusting tension lifting wing wheel assembly 1200. Although the separation mechanism employs a cam, it is understood that any mechanism that can control a distance between the tension lifting wing upper outer rim 1202 and the tension lifting wing lower outer rim 1222 can be employed.

The enhanced features of the lift angle adjusting tension lifting wing wheel assembly 1200 can be integrated into any of the previously described versions.

Although the tension lifting wing wheel assembly 800 is detailed for use as a generally horizontally oriented lifting device, it is understood that the tension lifting wing wheel assembly 800 can be generally vertically oriented for use as a propulsion device, for applications such as replacing or complimenting a propeller of an aircraft. The tension lifting wing wheel assembly 800 can also be installed on an aircraft wherein the tension lifting wing wheel assembly 800 rotates between a generally horizontal orientation and a generally vertical orientation.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REF NO. DESCRIPTION 100 turbine wheel assembly
102 turbine outer rim
104 turbine center hub
106 axle bearing
108 turbine spoke
109 airflow interior region
110 turbine blades
112 blade leading edge
114 blade trailing edge
116 posterior edge
118 interior edge
120 blade leading edge pivot
122 anti-slip interface
130 incident angle controller 132 angle control cleat
134 angle control tether
140 breakaway anchor
142 breakaway clip
144 breakaway frame
150 turbine blade
152 blade leading edge
154 blade trailing edge
156 posterior edge
158 interior edge
160 turbine blade
162 blade leading edge
164 blade trailing edge
166 posterior edge
168 interior edge
198 wind flow
199 resultant blade motion
200 turbine deployment assembly
202 vertical riser support
204 electrical power generator
206 turbine wheel shaft
210 counterbalance
212 counterbalance support beam
300 crossover spoke turbine wheel assembly
302 turbine outer rim
304 turbine center hub
306 axle bearing
308 turbine spoke
309 airflow interior region
310 turbine blades
400 cable supported mast turbine assembly
410 power generating central hub assembly
412 central hub
414 hub support member
416 hub coupling member
420 mast
422 mast distal end
430 pliant turbine blade
432 rigid turbine blade
434 retracted turbine blade portion
440 mast-to-mast tension cable
442 mast-to-axle tension cable
450 electricity generating apparatus
452 generator interface
460 electricity generating apparatus
462 generator interface
464 generator mount
470 retracting mechanism
500 wind operated electrical power generating system
510 wind operated turbine assembly
512 turbine housing
514 turbine blade subassembly
516 turbine blade
518 turbine blade subassembly shaft
519 vertical riser support structure
520 hydraulic pump
522 first hydraulic line
524 second hydraulic line
530 hydraulic motor
532 hydraulic motor shaft
534 hydraulic motor shaft rotational speed sensor
536 hydraulic motor shaft rotational speed sensor signal communication link
539 shaft coupling
540 electric generator
542 electric generator shaft
544 electric generator shaft rotational speed sensor
546 electric generator shaft rotational speed sensor signal communication link
549 electric output panel
550 grid tie
552 positive electrical output cable
554 negative electrical output cable
559 power grid
560 power control module
562 power control module electrical communication link
570 first rotational speed indicator
572 second rotational speed indicator
574 third rotational speed indicator
576 fourth rotational speed indicator
578 nth rotational speed indicator
580 first potentiometer
582 second potentiometer
584 third potentiometer
586 fourth potentiometer
588 nth potentiometer
590 transformer
599 system supporting surface
600 power output chart
602 rotational speed axis
604 power output axis
610 turbine theoretical output power curve
620 generator theoretical output power curve
630 stall point
700 power output chart
702 wind speed generated RPM axis
704 power output axis
710 current generator curve
720 turbine power curve
730 regulated generator curve
770 first RPM predetermined rotational speed
772 second RPM predetermined rotational speed
774 third RPM predetermined rotational speed
776 fourth RPM predetermined rotational speed
778 nth RPM predetermined rotational speed
780 first power output to grid tie
782 second power output to grid tie
784 third power output to grid tie
786 fourth power output to grid tie
788 nth power output to grid tie
800 tension wing lifting assembly
802 tension lifting wing outer rim
803 tension lifting wing central hub assembly
804 tension lifting wing first center hub flange
805 tension lifting wing second center hub flange
806 axle bearing
807 tension lifting wing leading spoke
808 tension lifting wing trailing spoke
810 winglet
812 winglet leading edge
814 winglet trailing edge
816 winglet upper surface
818 winglet lower surface
882 tension lifting wing outer rim aerodynamic surface
900 tension lifting wing wheel assembly
902 tension lifting wing outer rim
903 tension lifting wing hub assembly
904 tension lifting wing first center hub flange
905 tension lifting wing second center hub flange
906 axle bearing
907 tension lifting wing leading spoke
908 tension lifting wing trailing spoke distal segment
909 tension lifting wing trailing spoke proximal segment
922 spoke distal threading 924 spoke anchor flange
927 spoke proximal threading
928 spoke distal segment proximal threading
929 spoke proximal segment distal threading
930 spoke distal assembly tensioning nipple
932 spoke distal assembly tensioning nipple flange
934 spoke distal assembly tensioning nipple body
940 spoke distal assembly central tensioning system
942 spoke distal assembly central tensioning element
950 hub located spoke tensioning system
952 hub located spoke tensioning element
956 hub located spoke tensioning bracket
957 tensioning bracket cavity
1000 tension lifting wing wheel assembly
1002 tension lifting wing outer rim
1007 tension lifting wing leading spoke
1008 tension lifting wing trailing spoke
1022 spoke distal threading
1030 tensioning nipple assembly
1032 spoke tensioning nipple body
1034 spoke tensioning nipple flange
1036 spoke tensioning nipple spoke assembly retention surface
1050 spoke tensioning breakaway assembly
1060 tensioning stud
1062 tensioning stud trunk
1064 tensioning stud flange
1066 tensioning stud flange assembly retention surface
1070 tensioning assembly first coupling element
1071 tensioning assembly second coupling element
1073 tensioning coupling element nipple flange retention surface
1074 tensioning assembly coupling element connection cavity
1076 tensioning coupling element stud flange retention surface
1084 tension lifting wing rim inner surface
1100 tandem rotor heavy-lift helicopter
1110 tandem rotor heavy-lift helicopter fuselage
1112 tandem rotor heavy-lift helicopter front end
1114 tandem rotor heavy-lift helicopter rear end
1120 tandem rotor heavy-lift helicopter front landing gear
1122 tandem rotor heavy-lift helicopter rear landing gear
1130 tandem rotor heavy-lift helicopter forward rotor assembly
1131 tandem rotor heavy-lift helicopter forward rotor assembly angle
1132 tandem rotor heavy-lift helicopter rearward rotor assembly
1133 tandem rotor heavy-lift helicopter rearward rotor assembly angle
1140 forward rotor drive machine
1142 rearward rotor drive machine
1144 tandem rotor heavy-lift helicopter propulsion jet
1199 landing surface
1200 lift angle adjusting tension lifting wing wheel assembly
1202 tension lifting wing upper outer rim
1203 tension lifting wing first central hub assembly
1204 tension lifting wing first center hub flange
1205 tension lifting wing second center hub flange
1206 axle bearing
1207 tension lifting wing leading spoke
1208 tension lifting wing trailing spoke
1210 angle adjusting winglet
1212 angle adjusting winglet leading edge
1214 angle adjusting winglet trailing edge
1222 tension lifting wing lower outer rim
1230 tension lifting wing peripheral rim
1232 tension lifting wing angle adjusting cam
1238 upper outer rim axial adjusting controller feature
1239 lower outer rim axial adjusting controller feature
C1 wing chord
R1 inner radius of rim
R2 radius of spoke hub attachment holes
H1 height of rim H
S1 wing span

What is claimed is:

1. An aircraft tension lifting wing wheel assembly, comprising:
   an aircraft body;
   a rotor drive machine carried by the aircraft body;
   a tension lifting wing wheel assembly, the tension lifting wing wheel assembly operated by the rotor drive machine, the tension lifting wing wheel assembly including:
   a peripheral rim having a rim radius defined from a rim center to an interior edge of the rim;
   a central hub having a hub radius defined from a hub center to a spoke hub attachment location of the hub;
   a radial span dimension being defined as rim radius minus the hub radius;
   a plurality of spokes assembling the central hub at a rotationally centralized position within the peripheral rim; and
   a series of wings, each wing having an aerodynamically lifting shape extending between a leading edge and a trailing edge,
   wherein the each wing of the series of wings is assembled to the tension lifting wing wheel assembly by coupling an area of the wing proximate the leading edge to a leading edge spoke of the plurality of spokes and an area of the wing proximate the trailing edge to a trailing edge spoke of the plurality of spokes,
   wherein the wings are arranged having a gap provided between the wing trailing edge of each forward located wing and the wing leading edge of each trailing located wing.

2. The aircraft tension lifting wing wheel assembly as recited in claim 1, each wing having an outer edge located proximate the interior edge of the rim, the wing extending radially inward to an inner edge, a distance between the outer edge and the inner edge being less than fifty percent of the radial span dimension.

3. The aircraft tension lifting wing wheel assembly as recited in claim 1, the central hub further comprising:
   a first flange; and
   a second flange,
   wherein the first flange and the second flange are concentric with one another and spatially arranged along a rotational axis.

4. The aircraft tension lifting wing wheel assembly as recited in claim 1, wherein each leading edge spoke each respective trailing edge spoke is substantially parallel with one another.

5. The aircraft tension lifting wing wheel assembly as recited in claim 1, wherein each wing is formed further comprising an angle of attack that changes along a radial direction.

6. The aircraft tension lifting wing wheel assembly as recited in claim 1, further comprising a tensioning feature, wherein the tensioning feature adjusts a tension within each respective spoke.

7. The aircraft tension lifting wing wheel assembly as recited in claim 1, further comprising at least one spoke breakaway feature, wherein the at least one spoke breakaway feature releases a segment of a broken spoke from the tension lifting wing wheel assembly.

8. A vehicle, comprising:
a vehicle body;
at least one rotor drive machine carried by the vehicle body;
at least one a tension lifting wing wheel assembly, each tension lifting wing wheel assembly operated by a respective rotor drive machine of the at least one rotor drive machine, each tension lifting wing wheel assembly including:
a peripheral rim having a rim radius defined from a rim center to an interior edge of the rim;
a central hub having a hub radius defined from a hub center to a spoke hub attachment location of the hub;
a radial span dimension being defined as rim radius minus the hub radius;
a plurality of spokes assembling the central hub at a rotationally centralized position within the peripheral rim; and
a series of wings, each wing having an aerodynamically lifting shape extending between a leading edge and a trailing edge,
wherein the each wing of the series of wings is assembled to the tension lifting wing wheel assembly by coupling an area of the wing proximate the leading edge to a leading edge spoke of the plurality of spokes and an area of the wing proximate the trailing edge to a trailing edge spoke of the plurality of spokes,
wherein the wings are arranged having a gap provided between the wing trailing edge of each forward located wing and the wing leading edge of each trailing located wing.

9. The vehicle as recited in claim 8, wherein the vehicle is an aircraft,
wherein the vehicle body is a fuselage,
wherein one or more of the at least one a tension lifting wing wheel assembly is oriented to provide propulsion to the vehicle aircraft.

10. The vehicle as recited in claim 8, wherein the vehicle is a heavy lifting helicopter, the vehicle body is a fuselage,
wherein one or more of the at least one a tension lifting wing wheel assembly is oriented in a generally horizontal orientation to provide lift.

11. The vehicle as recited in claim 8, wherein the vehicle is a heavy lifting helicopter,
wherein the vehicle body is a fuselage,
wherein the heavy lifting helicopter comprises two tension lifting wing wheel assemblies,
wherein the two tension lifting wing wheel assemblies are oriented in a generally horizontal orientation to provide lift.

12. The vehicle as recited in claim 8, each wing having an outer edge located proximate the interior edge of the rim, the wing extending radially inward to an inner edge, a distance between the outer edge and the inner edge being less than fifty percent of the radial span dimension.

13. The vehicle as recited in claim 8, the central hub further comprising:
a first flange; and
a second flange,
wherein the first flange and the second flange are concentric with one another and spatially arranged along a rotational axis.

14. The vehicle as recited in claim 8, wherein each leading edge spoke each respective trailing edge spoke is substantially parallel with one another.

15. The vehicle as recited in claim 8, wherein each wing is formed further comprising an angle of attack that changes along a radial direction.

16. The vehicle as recited in claim 8, further comprising a tensioning feature, wherein the tensioning feature adjusts a tension within each respective spoke.

17. The vehicle as recited in claim 8, further comprising at least one spoke breakaway feature, wherein the at least one spoke breakaway feature releases a segment of a broken spoke from the tension lifting wing wheel assembly.

18. A tandem rotor heavy-lift helicopter, comprising:
a fuselage;
a pair of rotor drive machines carried by the fuselage;
a pair of tension lifting wing wheel assemblies, each tension lifting wing wheel assembly operated by a respective rotor drive machine of the pair of rotor drive machines, each tension lifting wing wheel assembly including:
a peripheral rim having a rim radius defined from a rim center to an interior edge of the rim;
a central hub having a hub radius defined from a hub center to a spoke hub attachment location of the hub;
a radial span dimension being defined as rim radius minus the hub radius;
a plurality of spokes assembling the central hub at a rotationally centralized position within the peripheral rim; and
a series of wings, each wing having an aerodynamically lifting shape extending between a leading edge and a trailing edge,
wherein the each wing of the series of wings is assembled to the tension lifting wing wheel assembly by coupling an area of the wing proximate the leading edge to a leading edge spoke of the plurality of spokes and an area of the wing proximate the trailing edge to a trailing edge spoke of the plurality of spokes,
wherein the wings are arranged having a gap provided between the wing trailing edge of each forward located wing and the wing leading edge of each trailing located wing.

19. The tandem rotor heavy-lift helicopter as recited in claim 18, wherein each tension lifting wing wheel assembly of the pair of tension lifting wing wheel assemblies is oriented to provide upward lift to the tandem rotor heavy-lift helicopter.

20. The tandem rotor heavy-lift helicopter as recited in claim 18, wherein each tension lifting wing wheel assembly of the pair of tension lifting wing wheel assemblies is generally horizontally oriented,
wherein a forward located tension lifting wing wheel assembly of the pair of tension lifting wing wheel assemblies is oriented at an angle slightly forward tilt in reference to a rearward located tension lifting wing wheel assembly of the pair of tension lifting wing wheel assemblies.

21. The tandem rotor heavy-lift helicopter as recited in claim 18, wherein each tension lifting wing wheel assembly of the pair of tension lifting wing wheel assemblies is generally horizontally oriented, wherein a forward located tension lifting wing wheel assembly of the pair of tension lifting wing wheel assemblies is generally parallel to and located closer to the fuselage in reference to a rearward located tension lifting wing wheel assembly of the pair of tension lifting wing wheel assemblies.

22. The tandem rotor heavy-lift helicopter as recited in claim 18, wherein each tension lifting wing wheel assembly of the pair of tension lifting wing wheel assemblies is generally horizontally oriented,
wherein a forward located tension lifting wing wheel assembly of the pair of tension lifting wing wheel assemblies and a rearward located tension lifting wing wheel assembly of the pair of tension lifting wing wheel assemblies rotate in opposite directions.

* * * * *